US011232458B2

(12) United States Patent
Bloch et al.

(10) Patent No.: US 11,232,458 B2
(45) Date of Patent: Jan. 25, 2022

(54) SYSTEM AND METHOD FOR DATA MINING WITHIN INTERACTIVE MULTIMEDIA

(75) Inventors: Jonathan Bloch, Brooklyn, NY (US); Barak Feldman, Tenafly, NJ (US); Tal Zubalsky, Brooklyn, NY (US); Kfir Y. Rotbard, Ramat Hasharon (IL)

(73) Assignee: JBF Interlude 2009 LTD, Tel Aviv (IL)

(*) Notice: Subject to any disclaimer, the term of this patent is extended or adjusted under 35 U.S.C. 154(b) by 0 days.

(21) Appl. No.: 13/034,645

(22) Filed: Feb. 24, 2011

(65) Prior Publication Data

US 2011/0202562 A1    Aug. 18, 2011

Related U.S. Application Data

(63) Continuation-in-part of application No. 13/033,916, filed on Feb. 24, 2011, now Pat. No. 9,607,655, which
(Continued)

(51) Int. Cl.
*G06F 16/74* (2019.01)
*G06Q 30/02* (2012.01)
(Continued)

(52) U.S. Cl.
CPC .......... *G06Q 30/02* (2013.01); *G06F 16/41* (2019.01); *G06F 16/745* (2019.01);
(Continued)

(58) Field of Classification Search
CPC .............. G06F 3/04842; G06F 3/0482; G06F 16/2246; G06F 16/743; G06F 2200/1614;
(Continued)

(56) References Cited

U.S. PATENT DOCUMENTS

| 4,569,026 A | 2/1986 | Best |
| 5,137,277 A | 8/1992 | Kitaue |

(Continued)

FOREIGN PATENT DOCUMENTS

| CA | 2639491 A1 | 3/2010 |
| DE | 2428329 A1 | 1/1975 |

(Continued)

OTHER PUBLICATIONS

International Search Report for International Application PCT/IL2010/000362 dated Aug. 25, 2010.
(Continued)

*Primary Examiner* — Ashish Thomas
*Assistant Examiner* — Mellissa M. Ohba
(74) *Attorney, Agent, or Firm* — Goodwin Procter LLP

(57) ABSTRACT

During the presentation of an interactive video, a user may interact with the interactive video by, e.g., making selections, choosing options, etc. related to one or more aspects of the interactive video. Such events and details regarding the events may be recorded, stored, and analyzed in the context of one or more campaigns associated with the interactive video, such as marketing campaigns, advertising campaigns, interactive examinations, etc. Once the details regarding the events have been stored, reports may be extracted based upon the details detailing any desired information relevant to the one or more campaigns.

19 Claims, 21 Drawing Sheets

Related U.S. Application Data is a continuation-in-part of application No. 12/706,721, filed on Feb. 17, 2010, now Pat. No. 9,190,110.

(51) Int. Cl.

| | | |
|---|---|---|
| G11B 27/036 | (2006.01) | |
| G06F 16/41 | (2019.01) | |
| G11B 27/11 | (2006.01) | |
| G11B 27/36 | (2006.01) | |
| G06Q 10/10 | (2012.01) | |
| H04N 21/8541 | (2011.01) | |
| G11B 27/34 | (2006.01) | |
| H04N 21/442 | (2011.01) | |
| G11B 27/034 | (2006.01) | |
| G06F 3/0484 | (2013.01) | |

(52) U.S. Cl.
CPC ....... *G06Q 10/101* (2013.01); *G06Q 30/0201* (2013.01); *G06Q 30/0241* (2013.01); *G11B 27/034* (2013.01); *G11B 27/036* (2013.01); *G11B 27/11* (2013.01); *G11B 27/34* (2013.01); *G11B 27/36* (2013.01); *H04N 21/44222* (2013.01); *H04N 21/8541* (2013.01); *G06F 3/04842* (2013.01); *G06F 3/04847* (2013.01)

(58) Field of Classification Search
CPC .... G06F 3/048; G06F 40/197; G06F 3/04847; G06F 16/41; G06F 16/958; G06F 2203/04803; G06F 3/012; G06F 3/013; G06F 3/017; G06F 3/04812; G06F 3/0488; G06F 3/147; H04N 21/435; H04N 21/44222; H04N 21/47202; H04N 21/4758; H04N 21/482; H04N 21/8541

See application file for complete search history.

(56) References Cited

U.S. PATENT DOCUMENTS

| | | | |
|---|---|---|---|
| 5,161,034 A * | 11/1992 | Klappert | G11B 19/00 386/234 |
| 5,568,602 A | 10/1996 | Callahan et al. | |
| 5,568,603 A | 10/1996 | Chen et al. | |
| 5,597,312 A | 1/1997 | Bloom et al. | |
| 5,607,356 A * | 3/1997 | Schwartz | 463/31 |
| 5,610,653 A | 3/1997 | Abecassis | |
| 5,636,036 A * | 6/1997 | Ashbey | G09B 5/065 348/578 |
| 5,715,169 A | 2/1998 | Noguchi | |
| 5,734,862 A * | 3/1998 | Kulas | G06F 3/061 345/473 |
| 5,737,527 A * | 4/1998 | Shiels | A63F 13/00 348/E7.071 |
| 5,745,738 A | 4/1998 | Ricard | |
| 5,751,953 A | 5/1998 | Shiels et al. | |
| 5,754,770 A | 5/1998 | Shiels et al. | |
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 5,956,037 A | 9/1999 | Osawa et al. | |
| 5,966,121 A * | 10/1999 | Hubbell | H04N 21/435 375/E7.024 |
| 5,983,190 A | 11/1999 | Trower, II et al. | |
| 6,067,400 A | 5/2000 | Saeki et al. | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 | 5/2001 | Shoff et al. | |
| 6,298,020 B1 | 10/2001 | Kumagami | |
| 6,298,482 B1 | 10/2001 | Seidman et al. | |
| 6,460,036 B1 | 10/2002 | Herz | |
| 6,535,639 B1 | 3/2003 | Uchihachi et al. | |
| 6,657,906 B2 | 12/2003 | Martin | |
| 6,698,020 B1 | 2/2004 | Zigmond et al. | |
| 6,728,477 B1 | 4/2004 | Watkins | |
| 6,771,875 B1 | 8/2004 | Kunieda et al. | |
| 6,801,947 B1 | 10/2004 | Li | |
| 6,947,966 B1 | 9/2005 | Oko, Jr. et al. | |
| 7,085,844 B2 | 8/2006 | Thompson | |
| 7,155,676 B2 | 12/2006 | Land et al. | |
| 7,231,132 B1 | 6/2007 | Davenport | |
| 7,296,231 B2 * | 11/2007 | Loui | G06K 9/00711 715/723 |
| 7,310,784 B1 | 12/2007 | Gottlieb et al. | |
| 7,379,653 B2 | 5/2008 | Yap et al. | |
| 7,430,360 B2 * | 9/2008 | Abecassis | H04N 21/4753 386/343 |
| 7,444,069 B1 | 10/2008 | Bemsley | |
| 7,472,910 B1 | 1/2009 | Okada et al. | |
| 7,627,605 B1 | 12/2009 | Lamere et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt | |
| 8,046,801 B2 | 10/2011 | Ellis et al. | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,202,167 B2 * | 6/2012 | Ackley | A63F 13/45 463/43 |
| 8,276,058 B2 | 9/2012 | Gottlieb et al. | |
| 8,281,355 B1 | 10/2012 | Weaver et al. | |
| 8,321,905 B1 | 11/2012 | Streeter et al. | |
| 8,350,908 B2 | 1/2013 | Morris et al. | |
| 8,600,220 B2 | 12/2013 | Bloch et al. | |
| 8,612,517 B1 | 12/2013 | Yadid et al. | |
| 8,626,337 B2 | 1/2014 | Corak et al. | |
| 8,646,020 B2 * | 2/2014 | Reisman | H04N 21/41407 725/133 |
| 8,650,489 B1 | 2/2014 | Baum et al. | |
| 8,667,395 B2 | 3/2014 | Hosogai et al. | |
| 8,750,682 B1 | 6/2014 | Nicksay et al. | |
| 8,752,087 B2 | 6/2014 | Begeja et al. | |
| 8,826,337 B2 | 9/2014 | Issa et al. | |
| 8,860,882 B2 | 10/2014 | Bloch et al. | |
| 8,930,975 B2 | 1/2015 | Woods et al. | |
| 8,977,113 B1 | 3/2015 | Rumteen et al. | |
| 9,009,619 B2 | 4/2015 | Bloch et al. | |
| 9,021,537 B2 * | 4/2015 | Funge et al. | 725/94 |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,363,464 B2 | 6/2016 | Alexander | |
| 9,367,196 B1 | 6/2016 | Goldstein et al. | |
| 9,374,411 B1 | 6/2016 | Goetz | |
| 9,390,099 B1 | 7/2016 | Wang et al. | |
| 9,456,247 B1 | 9/2016 | Pontual et al. | |
| 9,465,435 B1 | 10/2016 | Zhang et al. | |
| 9,473,582 B1 | 10/2016 | Fraccaroli | |
| 9,510,044 B1 | 11/2016 | Pereira et al. | |
| 9,520,155 B2 | 12/2016 | Bloch et al. | |
| 9,530,454 B2 | 12/2016 | Bloch et al. | |
| 9,538,219 B2 | 1/2017 | Sakata et al. | |
| 9,554,061 B1 | 1/2017 | Proctor, Jr. et al. | |
| 9,571,877 B2 | 2/2017 | Lee et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,672,868 B2 | 6/2017 | Bloch et al. | |
| 9,736,503 B1 | 8/2017 | Bakshi et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |

(56) References Cited

U.S. PATENT DOCUMENTS

| | | |
|---|---|---|
| 9,967,621 B2 | 5/2018 | Armstrong et al. |
| 10,070,192 B2 | 9/2018 | Baratz |
| 10,178,304 B1 | 1/2019 | Tudor et al. |
| 10,178,421 B2 | 1/2019 | Thomas et al. |
| 10,187,687 B2 | 1/2019 | Harb et al. |
| 10,194,189 B1 | 1/2019 | Goetz et al. |
| 10,257,572 B2 | 4/2019 | Manus et al. |
| 10,419,790 B2 | 9/2019 | Gersten |
| 10,460,765 B2 | 10/2019 | Bloch et al. |
| 10,523,982 B2 | 12/2019 | Oyman |
| 10,771,824 B1 | 9/2020 | Haritaoglu et al. |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0053089 A1 | 5/2002 | Massey |
| 2002/0086724 A1 | 7/2002 | Miyaki et al. |
| 2002/0091455 A1 | 7/2002 | Williams |
| 2002/0105535 A1* | 8/2002 | Wallace ............... G06F 3/0485 715/719 |
| 2002/0106191 A1 | 8/2002 | Betz et al. |
| 2002/0120456 A1 | 8/2002 | Berg et al. |
| 2002/0120931 A1 | 8/2002 | Huber et al. |
| 2002/0129374 A1 | 9/2002 | Freeman et al. |
| 2002/0140719 A1 | 10/2002 | Amir et al. |
| 2002/0144262 A1 | 10/2002 | Plotnick et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1* | 4/2003 | DeFrees-Parrott ......................... G07F 17/3267 463/16 |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0070595 A1 | 4/2004 | Atlas et al. |
| 2004/0091848 A1 | 5/2004 | Nemitz |
| 2004/0128317 A1 | 7/2004 | Sull et al. |
| 2004/0138948 A1* | 7/2004 | Loomis ............... 705/14 |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0251820 A1 | 11/2005 | Stefanik et al. |
| 2005/0251827 A1 | 11/2005 | Ellis et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0120624 A1 | 6/2006 | Jojic et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0212904 A1* | 9/2006 | Klarfeld ............... H04N 21/812 725/46 |
| 2006/0222322 A1 | 10/2006 | Levitan |
| 2006/0224260 A1 | 10/2006 | Hicken et al. |
| 2006/0274828 A1 | 12/2006 | Siemens et al. |
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1* | 7/2007 | Ben-Yaacov et al. .......... 705/51 |
| 2007/0220583 A1 | 9/2007 | Bailey et al. |
| 2007/0226761 A1 | 9/2007 | Zalewski et al. |
| 2007/0239754 A1 | 10/2007 | Schnitman et al. |
| 2007/0253677 A1 | 11/2007 | Wang |
| 2007/0253688 A1 | 11/2007 | Koennecke |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1* | 4/2008 | Harboe ............... G06F 3/0482 |
| 2008/0092159 A1* | 4/2008 | Dmitriev et al. ............. 725/34 |
| 2008/0148152 A1 | 6/2008 | Blinnikka et al. |
| 2008/0161111 A1* | 7/2008 | Schuman ............... A63F 13/10 463/41 |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0276157 A1 | 11/2008 | Kustka et al. |
| 2008/0300967 A1* | 12/2008 | Buckley et al. ............... 705/10 |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0024923 A1 | 1/2009 | Hartwig et al. |
| 2009/0029771 A1* | 1/2009 | Donahue ............... A63F 13/10 463/31 |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0226046 A1 | 9/2009 | Shteyn |
| 2009/0228572 A1* | 9/2009 | Wall et al. ............... 709/218 |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0297118 A1 | 12/2009 | Fink et al. |
| 2009/0320075 A1* | 12/2009 | Marko ............... 725/56 |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |

(56) References Cited

U.S. PATENT DOCUMENTS

| | | |
|---|---|---|
| 2010/0162344 A1 | 6/2010 | Casagrande et al. |
| 2010/0167816 A1 | 7/2010 | Perlman et al. |
| 2010/0167819 A1* | 7/2010 | Schell .................... A63F 13/10 463/36 |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1* | 11/2010 | Bloch ........................... 715/255 |
| 2010/0325135 A1 | 12/2010 | Chen et al. |
| 2010/0332404 A1* | 12/2010 | Valin ........................... 705/310 |
| 2011/0007797 A1* | 1/2011 | Palmer et al. ........... 375/240.01 |
| 2011/0010742 A1 | 1/2011 | White |
| 2011/0026898 A1* | 2/2011 | Lussier et al. ................. 386/280 |
| 2011/0033167 A1 | 2/2011 | Arling et al. |
| 2011/0041059 A1 | 2/2011 | Amarasingham et al. |
| 2011/0069940 A1 | 3/2011 | Shimy et al. |
| 2011/0078023 A1 | 3/2011 | Audrey et al. |
| 2011/0078740 A1 | 3/2011 | Bolyukh et al. |
| 2011/0096225 A1 | 4/2011 | Candelore |
| 2011/0126106 A1* | 5/2011 | Ben Shaul .............. A63J 25/00 715/723 |
| 2011/0131493 A1* | 6/2011 | Dahl ............................ 715/716 |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1* | 8/2011 | Bloch et al. .............. 375/240.25 |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0105723 A1* | 5/2012 | van Coppenolle .. H04N 21/812 348/564 |
| 2012/0110618 A1 | 5/2012 | Kilar et al. |
| 2012/0110620 A1 | 5/2012 | Kilar et al. |
| 2012/0120114 A1 | 5/2012 | You et al. |
| 2012/0137015 A1 | 5/2012 | Sun |
| 2012/0147954 A1 | 6/2012 | Kasai et al. |
| 2012/0159541 A1 | 6/2012 | Carton et al. |
| 2012/0179970 A1 | 7/2012 | Hayes |
| 2012/0198412 A1* | 8/2012 | Creighton et al. ............ 717/100 |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0173765 A1 | 7/2013 | Korbecki |
| 2013/0177294 A1 | 7/2013 | Kennberg |
| 2013/0202265 A1 | 8/2013 | Arrasvuori et al. |
| 2013/0204710 A1 | 8/2013 | Boland et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0290818 A1 | 10/2013 | Arrasvuori et al. |
| 2013/0298146 A1 | 11/2013 | Conrad et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0181271 A1 | 1/2015 | Onno et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |

(56) References Cited

U.S. PATENT DOCUMENTS

| | | |
|---|---|---|
| 2015/0067723 A1 | 3/2015 | Bloch et al. |
| 2015/0070458 A1 | 3/2015 | Kim et al. |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0256861 A1 | 9/2015 | Oyman |
| 2015/0258454 A1 | 9/2015 | King et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2016/0009487 A1 | 1/2016 | Edwards et al. |
| 2016/0021412 A1 | 1/2016 | Zito, Jr. |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0132203 A1 | 5/2016 | Seto et al. |
| 2016/0142889 A1 | 5/2016 | O'Connor et al. |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1 | 11/2016 | Prasad et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0041372 A1 | 2/2017 | Hosur |
| 2017/0062012 A1 | 3/2017 | Bloch et al. |
| 2017/0142486 A1 | 5/2017 | Masuda |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0286424 A1 | 10/2017 | Peterson |
| 2017/0289220 A1 | 10/2017 | Bloch et al. |
| 2017/0295410 A1 | 10/2017 | Bloch et al. |
| 2017/0326462 A1 | 11/2017 | Lyons et al. |
| 2017/0337196 A1 | 11/2017 | Goela et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0048831 A1 | 2/2018 | Berwick et al. |
| 2018/0068019 A1 | 3/2018 | Novikoff et al. |
| 2018/0115592 A1 | 4/2018 | Samineni |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |
| 2018/0262798 A1 | 9/2018 | Ramachandra |
| 2018/0314959 A1 | 11/2018 | Apokatanidis et al. |
| 2019/0075367 A1 | 3/2019 | van Zessen et al. |
| 2019/0090002 A1 | 3/2019 | Ramadorai et al. |
| 2019/0098371 A1 | 3/2019 | Keesan |
| 2019/0132639 A1 | 5/2019 | Panchaksharaiah et al. |
| 2019/0166412 A1 | 5/2019 | Panchaksharaiah et al. |
| 2019/0182525 A1 | 6/2019 | Steinberg et al. |
| 2019/0238719 A1 | 8/2019 | Alameh et al. |
| 2019/0335225 A1 | 10/2019 | Fang et al. |
| 2019/0354936 A1 | 11/2019 | Deluca et al. |
| 2020/0037047 A1 | 1/2020 | Cheung et al. |

FOREIGN PATENT DOCUMENTS

| | | |
|---|---|---|
| DE | 2359916 A1 | 6/1975 |
| DE | 004038801 A1 | 6/1992 |
| DE | 10053720 A1 | 4/2002 |
| EP | 0965371 A2 | 12/1999 |
| EP | 1033157 A2 | 9/2000 |
| EP | 2104105 | 9/2009 |
| GB | 2359916 A | 9/2001 |
| GB | 2428329 A | 1/2007 |
| JP | 2003-245471 A | 9/2003 |
| JP | 2008005288 A | 1/2008 |
| KR | 2004-0005068 A | 1/2004 |
| KR | 2010-0037413 A | 4/2010 |
| WO | WO-1996013810 A1 | 5/1996 |
| WO | WO-2000/059224 | 10/2000 |
| WO | WO-2007/062223 | 5/2007 |
| WO | WO-2007/138546 | 12/2007 |
| WO | WO-2008/001350 | 1/2008 |
| WO | WO-2008/057444 | 5/2008 |
| WO | WO 2008/057444 | 5/2008 |
| WO | WO-2008052009 A2 | 5/2008 |
| WO | WO-2009/125404 A2 | 10/2009 |
| WO | WO-2009/137919 | 11/2009 |

OTHER PUBLICATIONS

Supplemental Search Report for International Application PCT/IL2010/000362 dated Jun. 28, 2012.

International Search Report for International Patent Application PCT/IL2012/000080 dated Aug. 9, 2012 (4 pages).

International Search Report for International Patent Application PCT/IL2012/000081 dated Jun. 28, 2012 (4 pages).

Labs.byHook: "Ogg Vorbis Encoder for Flash: Alchemy Series Part 1," [Online] Internet Article, Retrieved on Dec. 17, 2012 from the Internet: URL:http://labs.byhook.com/2011/02/15/ogg-vorbis-encoder-for-flash-alchemy-series-part-1/, 2011, (6 pages).

Archos Gen 5 English User Manual Version 3.0, Jul. 26, 2007, pp. 1-81.

An ffmpeg and SDL Tutorial, "Tutorial 05: Synching Video," Retrieved from internet on Mar. 15, 2013: <http://dranqer.com/ffmpeg/tutorial05.html>, (4 pages).

Yang, H, et al., "Time Stamp Synchronization in Video Systems," Teletronics Technology Corporation, <http://www.ttcdas.com/products/daus encoders/pdf/ tech papers/tp 2010 time stamp video system.pdf>, Abstract, (8 pages).

U.S. Appl. No. 12/706,721 Published as US2010/0293455, System and Method for Assembling a Recorded Composition, filed Feb. 17, 2010.

U.S. Appl. No. 13/033,916 Published as US2011/0200116, System and Method for Seamless Multimedia Assembly, filed Feb. 24, 2011.

U.S. Appl. No. 13/622,780, Systems and Methods for Constructing Multimedia Content Modules, filed Sep. 19, 2012.

U.S. Appl. No. 13/622,795, Progress Bar for Branched Videos, filed Sep. 19, 2012.

U.S. Appl. No. 13/838,830, Systems and Methods for Synchronization of Selectably Presentable Media Streams, filed Mar. 15, 2013.

U.S. Appl. No. 13/921,536, Systems and Methods for Multiple Device Interaction with Selectably Presentable Media Streams, filed Jun. 19, 2013.

(56) References Cited

OTHER PUBLICATIONS

U.S. Appl. No. 14/107,600, Methods and Systems for Unfolding Video Pre-Roll, filed Dec. 16, 2013.
U.S. Appl. No. 14/139,996, Methods and Systems for In-Video Library, filed Dec. 24, 2013.
U.S. Appl. No. 13/622,780 Published as US2014/0078397, Systems and Methods for Constructing Multimedia Content Modules, Sep. 19, 2012.
U.S. Appl. No. 13/622,795 Published as US2014/0082666, Progress Bar for Branched Videos, filed Sep. 19, 2012.
Barlett, Mitch, "iTunes 11: How to Queue Next Song," Technipages, Oct. 6, 2008, pp. 1-8, retrieved on Dec. 26, 2013 from the internet http://www.technipages.com/itunes-queue-next-song.html.
Gregor Miller et al. "MiniDiver: A Novel Mobile Media Playback Interface for Rich Video Content on an IPhoneTM", Entertainment Computing A ICEC 2009, Sep. 3, 2009, pp. 98-109.
International Search Report and Writton Opinion for International Patent Application PCT/IB2013/001000 dated Jul. 31, 2013 (12 pages).
Sodagar, I., (2011) "The MPEG-DASH Standard for Multimedia Streaming Over the Internet", IEEE Multimedia, IEEE Service Center, New York, NY US, vol. 18, No. 4, pp. 62-67.
Supplemental European Search Report for EP13184145 dated Jan. 30, 2014 (6 pages).
U.S. Appl. No. 12/706,721 U.S. Pat. No. 9,190,110 Published as US2010/0293455, System and Method for Assembling a Recorded Composition, filed Feb. 17, 2010.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 14/884,285 Published as US2016/0170948, System and Method for Assembling a Recorded Composition, filed Oct. 15, 2015.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 15/356,913, Systems and Methods for Real-Time Pixel Switching, filed Nov. 21, 2016.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 15/481,916 U.S. Pat. No. 9,653,155 Published as US2015/0294685, Systems and Methods for Creating Linear Video from Branched Video, filed Apr. 10, 2014.
U.S. Appl. No. 15/481,916 Published as US2017/0345460, Systems and Methods for Creating Linear Video from Branched Video, filed Apr. 7, 2017.
U.S. Appl. No. 14/249,665 Published as US2015/0293675, Dynamic Timeline for Branched Video, filed Apr. 10, 2014.
U.S. Appl. No. 14/509,700 Published as US2016/0104513, Systems and Methods for Dynamic Video Bookmarking, filed Oct. 8, 2014.
U.S. Appl. No. 15/703,462, Systems and Methods for Dynamic Video Bookmarking, filed Oct. 13, 2017.
U.S. Appl. No. 14/534,626 Published as US2016/0105724, Systems and Methods for Parallel Track Transitions, filed Nov. 6, 2014.
U.S. Appl. No. 14/700,845 Published as US2016/0323608, Systems and Methods for Nonlinear Video Playback Using Linear Real-Time Video Players, filed Apr. 30, 2015.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 Published as US2017/0062012, Systems and Methods for Adaptive and Responsive Video, filed Aug. 26, 2015.
U.S. Appl. No. 14/978,464 Published as US2017/0178601, Intelligent Buffering of Large-Scale Video, filed Dec. 22, 2015.
U.S. Appl. No. 14/978,491 Published as US2017/0178409, Seamless Transitions in Large-Scale Video, filed Dec. 22, 2015.
U.S. Appl. No. 15/085,209, Media Stream Rate Synchronization, filed Mar. 30, 2016.
U.S. Appl. No. 15/165,373, Symbiotic Interactive Video, filed May 26, 2016.
U.S. Appl. No. 15/189,931, Dynamic Summary Generation for Real-time Switchable Videos, filed Jun. 22, 2016.
U.S. Appl. No. 15/395,477, Systems and Methods for Dynamic Weighting of Dynamic Weighting Video Paths, filed Dec. 30, 2016.
U.S. Appl. No. 15/997,284, Interactive Video Dynamic Adaptation and User Profiling, filed Jun. 4, 2018.
U.S. Appl. No. 15/863,191, Dynamic Library Display for Interactive Videos, filed Jan. 5, 2018.
U.S. Appl. No. 16/283,066, Dynamic Library Display for Interactive Videos, filed Feb. 22, 2019.
Google Scholar search, "Inserting metadata inertion advertising video", Jul. 16, 2021, 2 pages.
International Preliminary Report and Written Opinion of PCT/IL2012/000080 dated Aug. 27, 2013, 7 pages.
International Search Report of PCT/IL2012/000080 dated Aug. 9, 2012, 4 pages.
Marciel, M. et al., "Understanding the Detection of View Fraud in Video Content Portals", (Feb. 5, 2016), Cornell University, pp. 1-13.

\* cited by examiner

|  | SEGMENT 1 (502) | SEGMENT 2 CHORUS A (508) | SEGMENT 3 (520) | SEGMENT 4 CHORUS B (538) | SEGMENT 5 (560) |
|---|---|---|---|---|---|
| VARIATION 1 | 501↘ LONELY BOY (504) | LONELINESS IS SWEET (510) | BOY WATCHES GIRL IN CLASS (522) | SWEET LONELINESS LEADS TO GOOD LOVE (540) | DOGS CURE LONELINESS (562) |
| VARIATION 2 | LONELY GIRL (506) | LONELINESS IS PAINFUL (512) | BOY WATCHES GIRL AT WORK (524) | SWEET LONELINESS LEADS TO TROUBLE (542) | LOVE CURES LONELINESS (564) |
| VARIATION 3 | | LONELINESS FOLLOWED BY LOVE (514) | BOY THINKS ABOUT GIRL WHO MOVED AWAY (526) | SWEET LONELINESS MAKES LIFE WORTH LIVING (544) | GOOD TO BE A NUN (566) |
| VARIATION 4 | | LONELINESS BUT DON'T GIVE UP (516) | BOY MAKES UP IMAGINARY GIRL (528) | PAINFUL LONELINESS LEADS TO GOOD LOVE (545) | NOTHING CURES LONELINESS (568) |
| VARIATION 5 | | LONELINESS SO BECOME A NUN (518) | BOY WATCHES BOY IN CLASS (530) | PAINFUL LONELINESS LEADS TO TROUBLE (546) | |
| VARIATION 6 | | | GIRL DREAMS ABOUT TEACHER (532) | PAINFUL LONELINESS NEVER ENDS (548) | |
| VARIATION 7 | | | GIRL IS EMBARRASSED TO TALK TO BOY (534) | LONELINESS BUT DON'T GIVE UP (516) | |
| VARIATION 8 | | | GIRL FINDS A DOG (536) | | |

FIG. 5

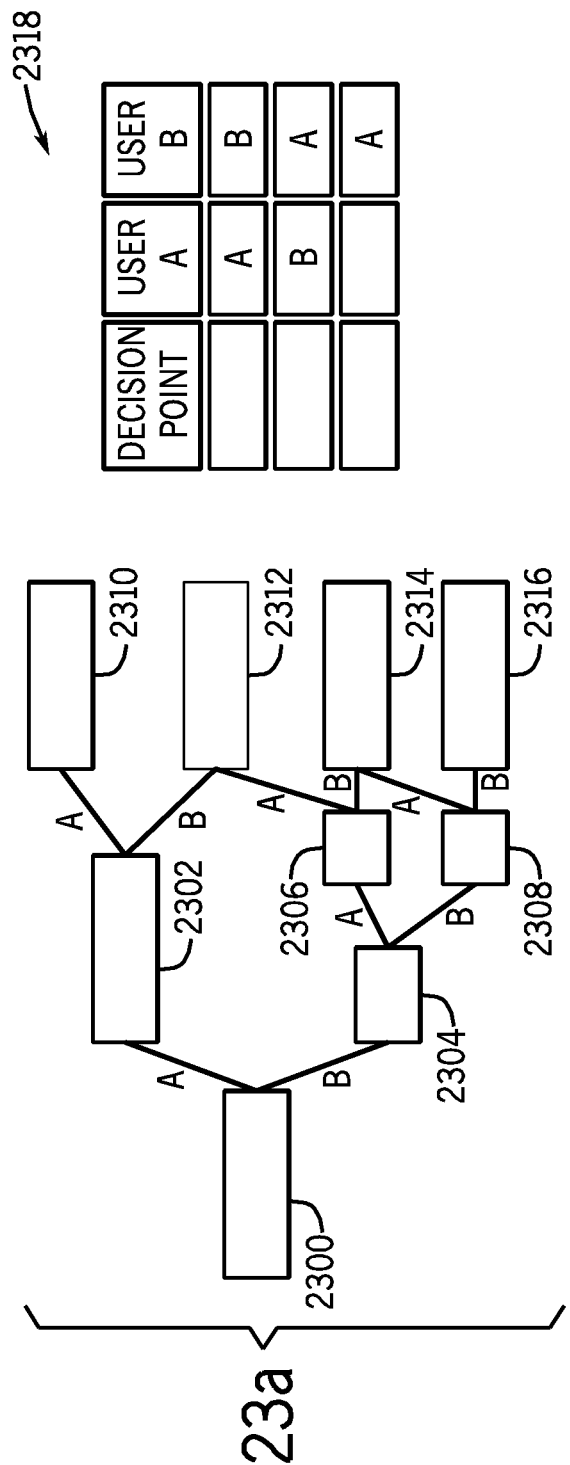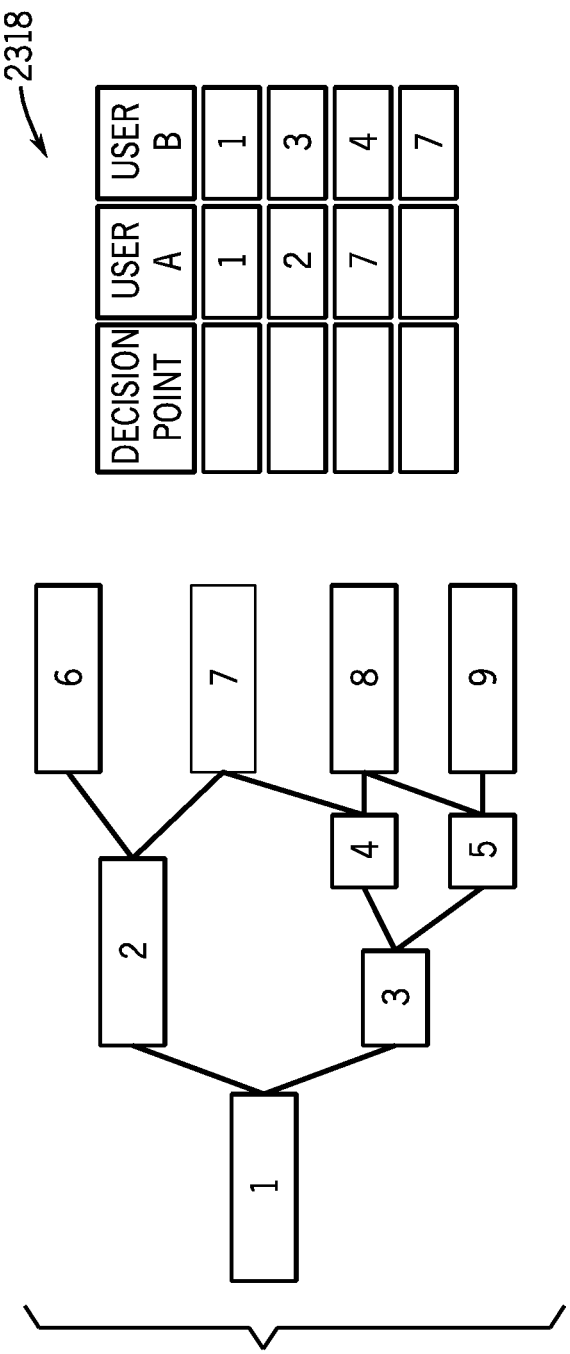
FIG. 23a
FIG. 23b

SYSTEM AND METHOD FOR DATA MINING WITHIN INTERACTIVE MULTIMEDIA

CROSS-REFERENCE TO RELATED PATENT APPLICATIONS

This application is a Continuation-in-part of U.S. application Ser. No. 13/033,916, filed Feb. 24, 2011, which is a Continuation-in-part of U.S. application Ser. No. 12/706,721 filed Feb. 17, 2010 both of which are incorporated herein by reference in their entirety.

FIELD OF THE INVENTION

The present invention generally relates to gathering information based upon user interactions with seamless interactive multimedia content.

BACKGROUND OF THE INVENTION

Artists such as singers, film producers, or videographers may record and make available more than one version of a particular composition, or multiple variations of a part of a composition. Such versions may include for example an acoustic version of a song, an electric or synthesized version of the same song, a hip-hop version, a classical version, etc. Similarly, various artists may record and make available their own cover versions of the same song.

It would be advantageous to allow, e.g., other artists, to create a composition that may include certain variations of parts of the original composition, or of parts of variations of similar or different compositions so that versions of the same composition may be recorded and made available for users or consumers to select from, depending on their taste, mood or other preference.

Additionally, conventional systems and methods of assembling multimedia content, such as video, include seamless offline assembly and internet video streaming. Seamless offline assembly of video/audio syncs on a local computer may be performed with video editing software (e.g., Adobe® Premiere®, Avid Media Composer®, etc.). Such software is applied to video/audio syncs that are already downloaded to or resident on, e.g., a computer upon which the software is also executed upon. By rendering several pieces of one or more videos on a linear timeline, the different pieces can be assembled as desired. However, this type of assembly cannot be performed in real-time. In the case of Internet video streaming, a streaming video player has the ability to play videos one after the other, for example, pre-rolls and post rolls. However, such sequential presentation of multiple videos is not achieved in a seamless manner because the transitions between one or more segments of the videos are always apparent as a loading-buffer, hiccup, or a delay in the video, the audio, or both. Hence, conventional systems and methods do not provide a way to seamlessly connect videos in real-time, especially when utilizing multimedia platforms like Adobe® Flash® which utilizes high-quality audio encoding which cannot be seamlessly stitched together.

Additionally still, conventional systems and methods merely provide for passive consumption of multimedia content, instead of allowing a user to interact with the multimedia content. Likewise, passive consumption of multimedia content provides no way for user interactions with multimedia content to be recorded. It would be advantageous to collect information regarding such user interactions for various purposes, such as, e.g., research purposes, marketing purposes, diagnostic testing, educational purposes, etc.

SUMMARY OF THE INVENTION

One embodiment of the invention relates to a method of data mining. The method comprises recording, via a statistics engine, at least one event based upon interaction with the interactive video presented on a computing device. Additionally, the method comprises transmitting a request from the statistics engine containing data concerning the recorded event, storing the data in a database, and extracting a report generated based upon the stored data.

Another embodiment of the invention relates to a system for data mining, comprising a player application implemented on a computing device, configured to present an interactive video. The system for data mining also comprises a statistics engine, implemented within the player application, configured to record at least one event based upon interaction with the interactive video, and subsequently transmit a request containing data concerning the recorded event. Further still, the system for data mining comprises a server-hosted data manager configured to store the data in a database upon receipt of the request, and a report extractor configured to extract a report generated based upon the stored data.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 5 is a flow diagram of multiple variations of segments of a composition, and possible connections between the variations, in accordance with an embodiment of the invention;

FIGS. 23a and 23b are exemplary representations of option and decision point trees and respective logs/reports in accordance with an embodiment of the invention.

DETAILED DESCRIPTION OF THE PREFERRED EMBODIMENTS

Figure 1:
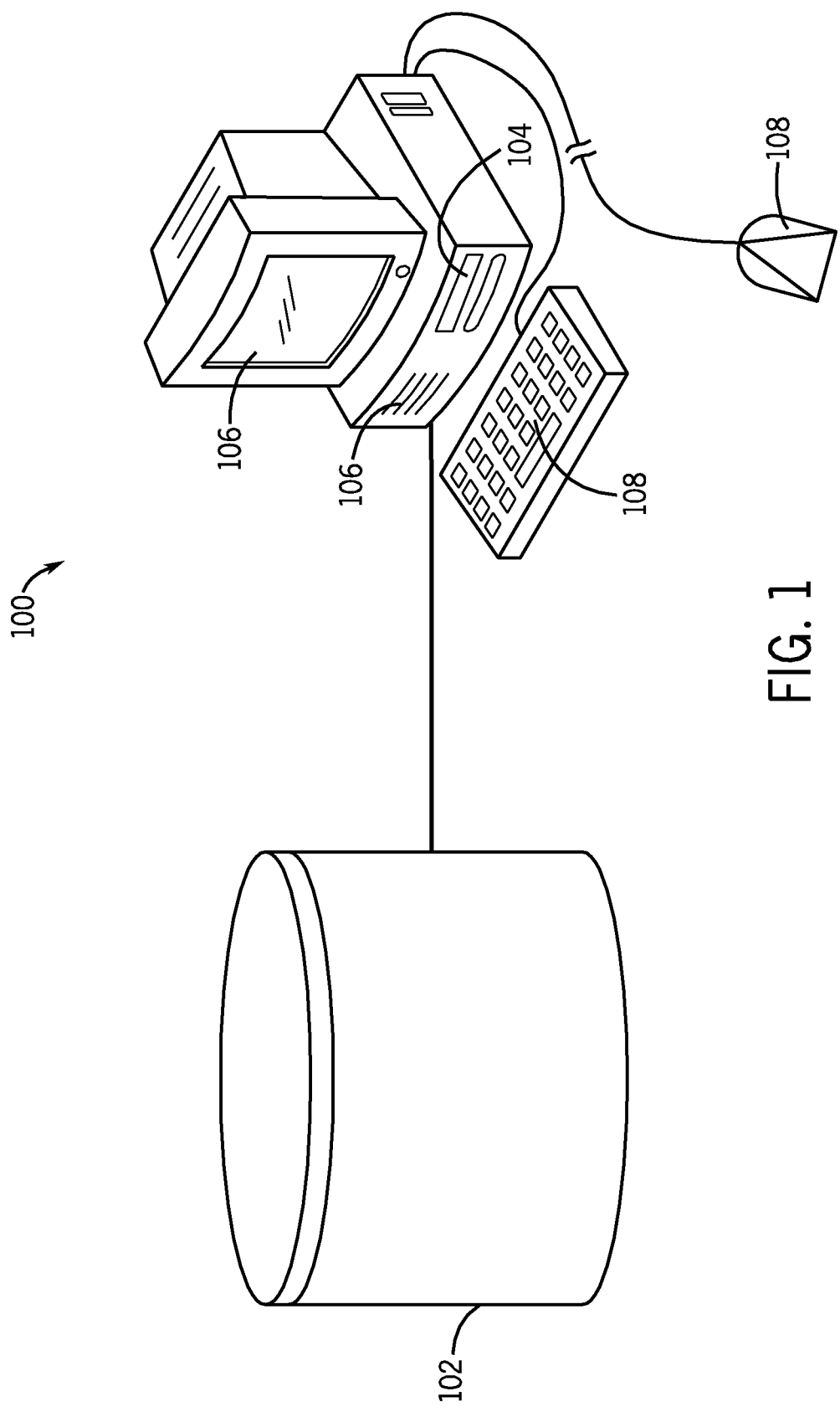
FIG. 1 is a conceptual illustration of a system in accordance with an embodiment the invention.

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "adding," "associating," "selecting," "evaluating," "processing," "computing," "calculating," "determining," "designating," "allocating," or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. An embodiment of the invention may be practiced through the execution of instructions that may be stored on an article such as a disc, memory device or other mass data storage article. Such instructions may be for example loaded into one or more processors and executed.

As utilized herein, the terms "composition" or "work", may, in addition to their regular definition, refer to a song, musical opus, video presentation, audio recording, film, movie, advertisement or other collection of audio and or audio plus visual signals that are assembled into a work that has identifiable components. For example, a composition may refer to a song having stanzas and verses, or bars and phrases, where in general, stanzas are linked to or follow verses, and verses are linked to or follow stanzas. The terms "mode" or "version" of a composition may, in addition to its regular definition, refer to a style or identifiable characteristic of a particular recording of a given composition, or a recording made or sung by a particular artist. For example, a given song, video, speech or film may be recorded in an acoustic version, an electric version, a hip-hop version, a jazz version or other versions. The same song or video may be recorded by various artists or combination of artists in their own respective versions. In some embodiments, each of such versions may include all of the components of the particular composition, such as all or most of the stanzas, verses, notes or scenes of the composition.

As utilized herein, a "segment" may in addition to its regular meaning, refer to a pre-defined portion of a work or composition, or an interval of either a defined or undefined period during a work or composition that may be set off with a start time at a certain point during the composition, and/or an end time during the composition, at which point another segment of the composition may begin or at which point a non-segmented portion of the composition may resume. In some embodiments, a segment may refer to a space or blank during a song or composition into which space or blank a variation may be inserted.

As utilized herein, a "progression of a recording" may refer to a scale or measure of the progress of a recording relative to its complete play. For example, a progression may refer to an elapsed time or period of a recording, as such time or period may be initiated from a beginning or end of a recording. In some embodiments, a progression may refer to a point in a series of musical notes, lyrics, images or other known events or markers in each of two or more recordings of the composition. For example, if the notes or lyrics or a musical or audio composition are known, a progression of the recording may include a tracking of the notes played or heard in one or more versions of the recording. A progression may be consistent between two or more versions of a recording such that a point in a progression of a first version may be tracked and associated with a corresponding point on a second version.

As utilized herein, the term "variation" may, in addition to its regular meaning, mean a portion of a song, movie, clip, or advertisement that may be inserted into or combined with one or more other portions of a song, movie or clip at a predefined point in the song, movie or clip. A variation may include lyrics, music, images or music that are different from the original song, movie or clip into which the variation is being added, and that are different from the other variations. A variation may be differentiated from a version in that while a version will generally be or include the same work that is being sung or played in a different way, a variation may be or include a different lyric, song or beat but that may be related to the original song or to the other segments to which the variation may be added by the fact that it is musically similar or creates a musically, lyrically or visually desired effect when it is combined with the other segments to which it is added.

Reference is made to FIG. 1, a conceptual illustration of a system in accordance with an embodiment of the invention. In some embodiments, system 100 may include, for example, a memory 102 such as a magnetic storage device, flash memory, RAM or other electronic storage device suitable for mass storage of data such as digital or analog audio or video data. In some embodiments, one or more segments of memory 102 may be divided or structured into a data base or other structured format that may associate one or more data entries in memory 102 with one or more other data entries in memory 102. In some embodiments, structured data may be stored or accessible by reference to for example, a mark up language such as for example, XML or other mark up languages. System 100 may also include a processor 104 such as a processor suitable for digital signal processing, encoding and decoding of large data streams and for large-scale data manipulations such as image processing. Processor 104 may include more than one processor such as for example a CPU and a video processor that may operate for example in parallel or in other configurations. System 100 may also include a display or output device 106, such as speakers or a video display, and an input device 108 such as a key-board, mouse, touch screen or other input device 108.

In operation, memory 102 may be loaded with or store two or more versions of a composition such as a song or video. For example, the system 100 may be connected to a data network such as the Internet, where the two or more versions of the composition are downloaded by a user from a content server/provider to the system 100 and stored. Alternatively and in accordance with some embodiments of the invention, a user may receive the composition on the system 100 as, e.g., streaming content. Each of the recorded and stored versions may be marked or divided into segments, where each such segment represents or is associated with a known portion of the composition. The beginning or ending markings of such segments may not be visible or audible, but may designate or set-off the start and/or end of the segment.

A user may be presented with a selection of versions of the composition, and may choose a first version that is to be played. At some point in the progression of the first chosen version, the user may select a segment of second version of the recording that is to be inserted as part of a new version of the recording that the user is creating. Processor 104 may identify the segment most closely fitting the user's selection, and may copy or insert the selected segment of the second version into the version of the composition that the user is creating. This process may be repeated until all of the segments of the recording are included in the user's new version.

The user may in this way, select a first stanza or segment of, for example, a song in an acoustic mode, a second stanza from an electric mode and a cadence from a jazz mode. In some embodiments the segments may be combined seamlessly so that beat, rhythm, pitch and other musical characteristics are retained in the movement from a segment in one mode to a segment in another mode and so that a complete, uninterrupted and seamless version of the new version is created that includes a segment from the acoustic version, a segment from the electric version and a cadence from the jazz version.

In some embodiments, segments may divide all or some of the recorded versions of a composition, such that a first segment of each of the rock, acoustic and jazz versions of a composition may include only a first stanza or other predefined portion of the composition in each of the versions. The second segment in each of the same rock, acoustic and jazz versions may include only the second stanza of the composition. Subsequent segments may include for example subsequent stanzas or verses, instrumental portions, cadences or other portions of the composition. Parallel segments in each of the versions may thereby define particular portions of the composition. For example, a fifth segment in each of the rock and acoustic versions may point to and include, e.g., the twelfth through fifteen line of the song or video that is the subject of both of the recorded versions. In some embodiments, the segment markers or set off points may be loaded into, for example, a mark-up data language such as an XML format, and the segments of many recorded versions may be associated to each other.

In some embodiments, a play speed of one or more versions of a recording may be altered so that the total duration of the various versions of the composition from which segments may be chosen, may be relatively or approximately uniform. Such alterations of play speed may be performed with tools such as ableton live™, qbase™ or other suitable audio recording tools.

Each of the respective first, second, third, and nth markers, break points or segment set-off points of all of the recorded versions of a particular recording will therefore uniformly point to the identical portions of the recorded work. Such uniform definition of the segments may allow the segments, when combined, to create a musically seamless or continuously flowing work without the need for a user to make further adjustments to links between the segments. For example, a user may select a first segment from a first version, a second through fourth segment from a second version and a final segment from the first version, and such segments may be combined by the processor 104 to create a seamlessly flowing version of the recording.

In some embodiments, a version may contain many or even hundreds of defined segments so that a processor 104 may locate a segment point that is close to any point in the recording even if the user did not issue a signal to switch segments at the precise timing or location of a segmentation point.

In some embodiments, a system may store the various segments (or pointers to such segments) that were selected by a user from two or more versions, and may replay the segments as a new version created by a user. In this way, users may create new versions of a known recording by assembling pieces of various versions of the recording.

Figure 2:
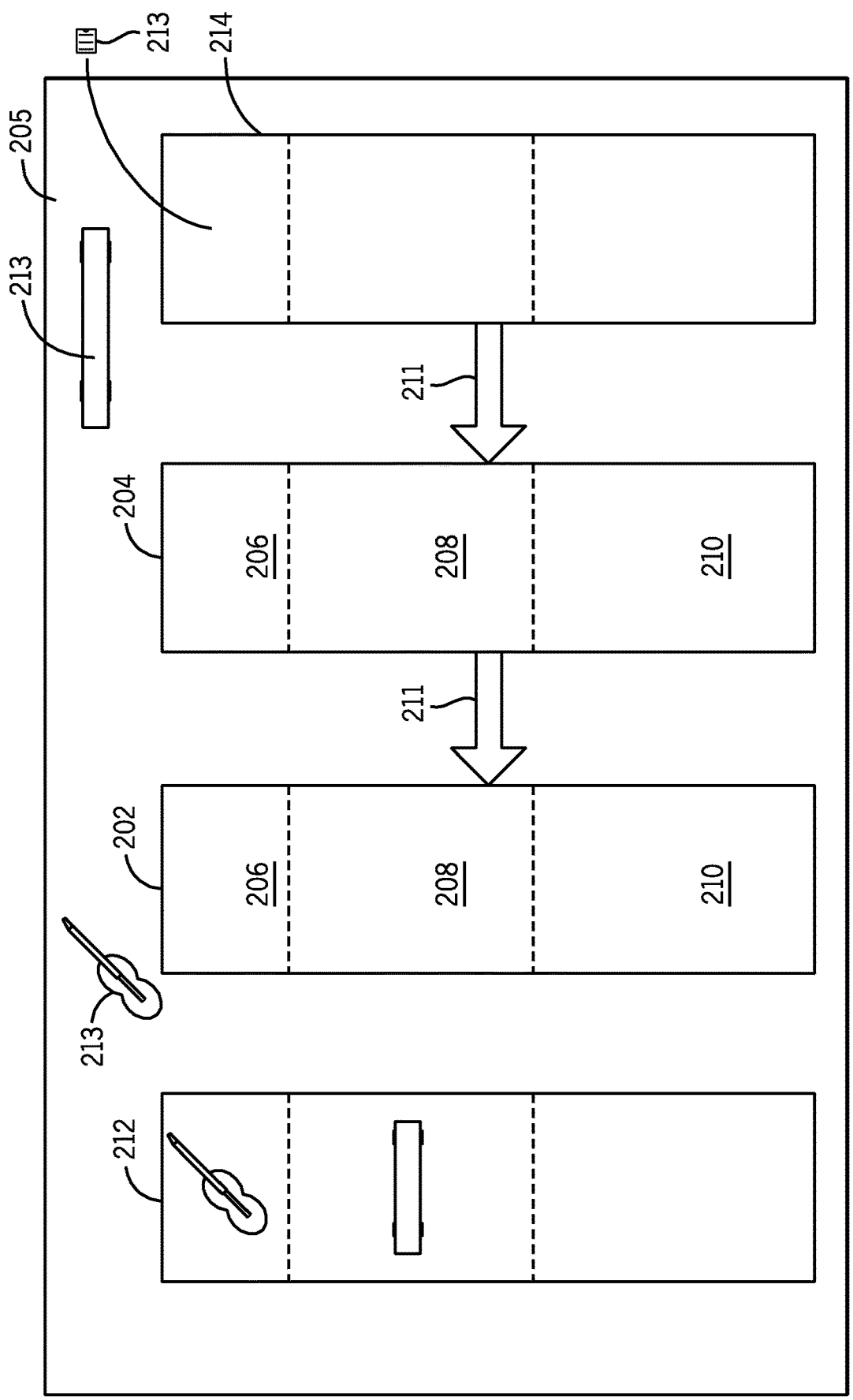
FIG. 2 is a conceptual illustration of segments of various versions of a composition and possible combinations of such segments into a created version of the composition in accordance with an embodiment of the invention.

Reference is made to FIG. 2, a conceptual illustration of a display of versions and segments of versions of a composition in accordance with an embodiment of the invention. A display may present a representation of a first version 202 and a second version 204 of a recording by way of for example a graphic user interface 205, and may indicate graphically, the mode of each of the displayed versions 202 and 204, and the location (by way of for example a graphic arrow or marker 211) in a progression of the recording of the various segments 206, 208 and 210 that are defined in the versions. For example, a particular version may be labeled with a name, icon 213 or avatar that may represent the version or the artist who performed the version.

A recording may begin to play by way of a video and/or audio output, and the display may indicate to a user the progress of the playing of the version of the recording on a display. In advance of reaching for example an end of a defined segment 208, the display may indicate an upcoming decision point wherein the user may decide which, if any, of the possible choices of segments 208 from other versions 204 may be inserted into the version that he is creating. In some embodiments, a display of a countdown may be added to indicate to the user the point on the recording by which he must make his selection during the course of the play of the then current version. In advance of the decision point, a display of the possible alternative segments 208 from versions 204 and 214 that may be selected may be provided to the user, and such display may hover and then disappear when the decision point passes or a selection of a new segment 208 has been made.

In some embodiments, if no selection of an alternative segment is made by a user, the default action may be set to continue playing the version that is then progressing. Other defaults may be used such as for example randomly altering versions at one or more segment breaks. If a selection of a segment from another version 214 is made, the graphic display may indicate the new version then being played, and may for example highlight or otherwise show the path of the various segments that have been selected for inclusion in the new version and the current version being played.

In some embodiments, the path or segments from versions that have been selected may be displayed for the user, and stored to show and retain the new version created by the user. The segments may be joined to create an original version of the recording consisting of various segments of assorted versions of the composition.

In some embodiments, a user may download, e.g., via some data network, or otherwise import into a client or other application the versions from which selections of segments may be made. In some embodiments, no such downloading may be required, and instead a reference, such as an HTML site, to segments of various versions that are stored remotely, may be presented to the user, and the user may store his newly created version by storing such references to the remotely stored versions. In some embodiments, the application may detect the bandwidth that is available on the user's computer as well as the speed of the recording, and may store or download the appropriate amount of data to facilitate smooth playback. In some embodiments, the user's created version 212 may also be stored remotely and made available to other users who may for example download version 212 to a computer or other device, use segments of such user's version 212 to create their own new versions, or other uses.

The client or application may include control functions such as for example play, pause, rewind, volume and other common controls for audio and video recording or playing.

Figure 3:
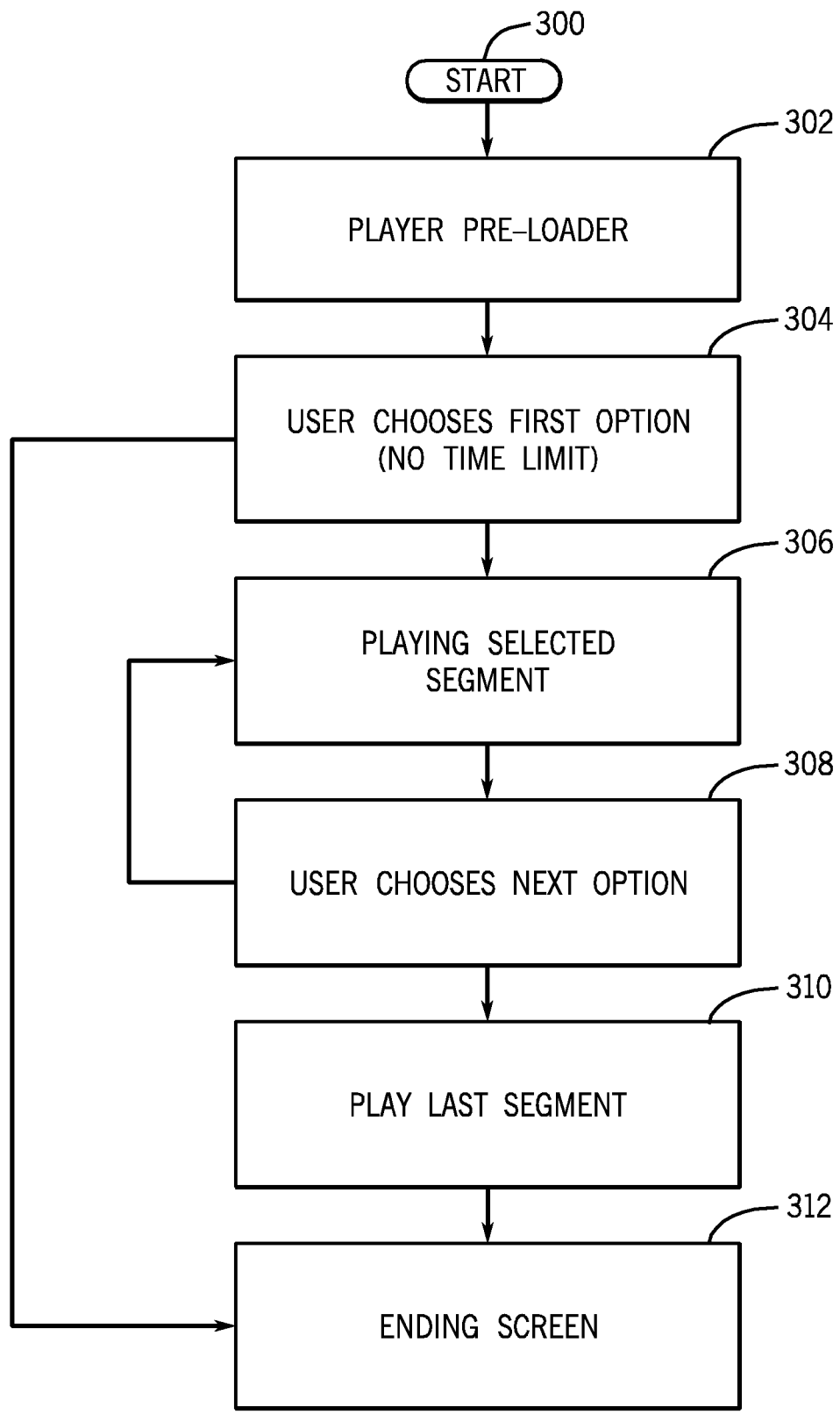
FIG. 3 is a flow diagram of a method in accordance with an embodiment of the invention.

Reference is made to FIG. 3, a flow diagram of a method in accordance with an embodiment of the invention. In block 300 a user may be presented with a start screen where for example the user may select the recording and two more versions of the recording that may be available. In some embodiments, various characteristics, data and descriptions of the recording and the version may be loaded into the application and may be displayed. In block 302, the player may be pre-loaded with at least some of, or portions of, the initial segments of the various versions of the recording, as were selected by the user. In block 304 the user may select the version for the first segment from which the recording is to begin, and the first segment of such version may become the first segment in the user's new version. In block 306, the selected segment may be played for the user, and portions of the upcoming segments that may be selected by a user at the next decision point may be pre-loaded or buffered into the application. In block 308, if the segment then being played is not the last segment of the recording, one or more versions of the subsequent segment or segments may be presented to the user for his selection. In block 310, the process of presenting and selecting segments of a recording may continue until the last segment of the recording is reached. In block 312, an ending screen may be presented to a user where the summary of the selected and assembled segments are displayed or played, and the user may be prompted to save, share, upload or otherwise use the newly created version.

Figure 4:
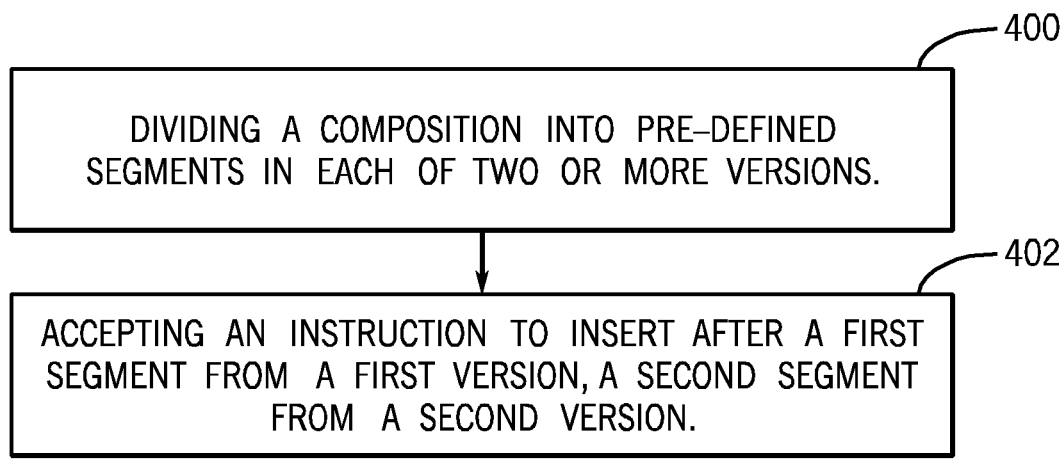
FIG. 4 is a flow diagram of a method in accordance with an embodiment of the invention.

Reference is made to FIG. 4, a flow diagram of a method in accordance with an embodiment of the invention. In block 400, there is presented an indication of versions of a composition, where each such version includes segmentation marks at each of a number of pre-defined points. In block 402, a segment from a first version is joined at one of the pre-defined points to a segment from a second version. In block 404, there is stored or recorded an indication of the joined segments from each of the versions and an indication of the segmentation point at which such segments were joined.

In some embodiments, a signal may be issued in advance of the end of segment, to alert the user that the current segment will soon be completed and that he will have an opportunity to change or alter the flow of his newly created version by substituting a segment from a different version that the one he is now using. If the user does not input a signal for such substitution, then the display may default to continue showing or playing the version then being played or may choose a random version to add to the segments that were already assembled.

In some embodiments, there may be presented to a user an indication of which segments from among the various versions are suitable for being assembled onto the version then being played. For example, at a particular point in a song, a piano instrumental may be heard, and a display may show that another version of the song includes a guitar instrumental that can break up the piano instrumental and that can be inserted after the piano instrumental. The display may also indicate than at an a cappella version of the song may not be suitable or appropriate for insertion at such point.

In some embodiments, a display may be presented that shows the origin or the various segments that have been assembled into the newly created version. For example, a graphic or icon of a guitar may be overlaid onto a first segment of the user's newly created version to show that that the source of the segment is an electric guitar version or a hip-hop mode or other version of the recording. The icon or graphic of the segment as incorporated into the newly created version may be similar to or identical with the icon or graphic of the version that was the origin of the segment. An avatar of a particular singer may be overlaid onto a second segment to show that such second segment was taken from a version performed by the particular singer.

In some embodiments, a process of assembling the various segments may include linking an end of the first segment with a start of the second segment while maintaining a musical flow of the newly created version. For example, the segments may be linked to maintain a beat, key, tone, pitch or other characteristics of one or more of the original versions.

In some embodiments, a processor may accept a signal from a user at various points in the course of the play or display of a version of the composition, even if such points are not associated with a defined break point or segmentation point. The processor may then select the closest or otherwise most suitable break point or segmentation point that can be used to alter the flow of the play to substitute the then current segment for a segment selected by the user.

In some embodiments, a processor may modify a duration of various versions of a composition so that such durations are approximately the same.

In some embodiments, one or more artists or composers may record multiple variations of one or more segments of a song or music video. For example, a segment of a love song may be recorded in the masculine, as a man singing about a woman, or in the feminine, as a woman singing about a man, such that in the first variation of a segment, the song is about "her eyes", and in the second variation of the segment the song is about "his smile". Another segment may be recorded in a first variation where a man and a woman break up and never see each other, in a second variation of the segment where the man and the woman break up but then get back together again, and in a third variation of the segment where the man and the woman break up and the woman returns to demolish the man's car. Other variations and permutations of segments may be recorded and presented to a user to create possible story lines that may be combined to weave different plots, song settings, genders or other factors in a song or music video. A user may select a first segment from among the first segment variations, and combine that segment with a second segment from among the second segment variations, and may continue combining segments into a song that carries a different plot, setting, ending or one or more other factors that are unlike any of the existing songs that were recorded by the artist. All of the segment variations may be of pre-defined length or have pre-defined starting and/or ending points at which each of such segment variations may be joined with one or more other segments.

In some embodiments, a variation may be inserted at a pre-defined starting point or break point (n), but may end at one of among several subsequent pre-defined ending points (n+2, n+3, etc.), rather than at the next break point (n+1). In this way, a long variation may be added in a spot that would otherwise have been filled with a shorter variation. In some embodiments, the various segments that may be combined may not share a particular melody, duration, tempo, musical arrangement or other predefined characteristics, except for a designation by the system of a pre-defined beginning and/or end to the particular segment, and that an end to a first segment is to be followed by a beginning of one from among various second or subsequent segments.

Reference is made to FIG. 5, a conceptual diagram of numerous possible variations of a series of segments that may be constructed into a song or music video. For example, in a first segment 502, a user may be presented with two variations from which he may choose, a first variation 504 is a stanza about a lonely boy, and a second variation 506 is a stanza about a lonely girl. If a user selects segment 504 as a first segment in the construction of his song or video, then the system will limit, define or present to the user that only variations 510 through 516 in segment 2 508 are suitable to follow selected variation 504 of segment 1 502 that can follow. In FIG. 5, the suitability of variations that may follow a selected variation are shown as solid lines 501. As shown in FIG. 5, variation 518 may not be suitable to follow variation 504, and a user will therefore not be presented with variation 518 as a possible variation to follow variation 506. If a user first selects variation 504 as his selection for segment 1 502, and then selects variation 510 as his choice for segment 2 508, the system may present variations 522 to 530 to the user for possible selection as segment 3 520. This process of presentation, selection of possible variations and choice by the user may be continued until for example a variation has been selected for all of the segments. In some embodiments, a variation need not be chosen for each segment. For example, if a user chooses variation 506 for segment 1 502, and then chooses variation 518 as a selection for segment 2 508, the user may then be presented with variation 566 as a final selection for the user's song, such that the user will have selected only three segments that are to be constructed into a song or video. In some embodiments, a variation in a prior segment may be re-used or presented again as a possible choice in a subsequent segment. For example, variation 516 may be presented as a possible choice for segment 2 508, and may be presented again as a possible choice for segment 4, such that a variation may be re-used in multiple segments in a work. In some embodiments, a use of a variation 516 in segment 4 538 may be associated with different variations in segment 5 560 to account for the use of variation 516 twice or to account for the placement of variation 516 near the end of the work.

Referring to the variations presented in FIG. 5, it should be noted that various embodiments of the invention may employ smart buffering which refers to methods for loading segments for, e.g., an interactive video, such that all possible segments that may be chosen by a user are loaded by system 100, client device, encoder (as will be discussed in greater detail below), etc. That is, such segments may be loaded or may begin being loaded prior to any applicable connection/attachment point to insure that a next or subsequent segment is ready for play/presentation. As there may be many possible segments that a user may choose, user path can be predicted, such that any segments that the user cannot reach by virtue of, e.g., choices/segments already chosen, are ignored. For example and referring to FIG. 5, variations 510, 512, 514, and 516 are possible choices for segment 2 508 if a user chooses variation 504 for segment 1 502. However, variation 518 is not a possible choice for segment 2 508 if variation 504 is chosen. Hence, variation 518 may be ignored. Additionally, after each new option/choice is made by a user, the part of a decision point/option tree (as discussed in greater detail below) or matrix that was loaded may be "trimmed" and hidden from the user. It should be noted that trimming as described herein may refer to completely ignoring a segment and/or preventing the loading thereof, even if the particular segment may already be in the process of being loaded.

In some embodiments, a user may be presented with a selection of variations for one or more segments, and may choose a first variation that is to be played or assembled. At a certain point during the segment or after the segment ends, the user may select a variation for the second segment as part of a new version of the recording that the user is creating. A processor may identify one or more segments that closely fit the user's selection and that match or are musically compatible with the then just-ended segment. The processor may assemble the selected or closely fitting segment after the then just-ended segment. This process may be repeated until some or all of the segments of the recording have been selected in the user's new version. As part of the selection process, the processor may match musical characteristics of one or more previously selected segments to the possible segments that may be selected by the user in subsequent segments. Such assistance by the processor may increase the musical quality of the assembled segments. In some embodiments, a user may be presented with the relative quality of the match between assembled segments or variations that are presented for possible assembly. For example, a processor may compare any or all of rhythm, pitch, timing or other characteristics of variations and indicate to a user which of the variations includes characteristics that would match the segments already assembled.

In some embodiments, a user may select a variation to be inserted in a segment even after the pre-defined insertion point has passed in the playing of the song 2. In such case, the variation to be inserted may be stored and played in the point designated for insertion in a next playing of the composition. In some embodiments, a selection variation may be associated with one or more next variations from which a user may select to follow the selected variation.

In some embodiments, a system may randomly select variations for insertion into some or all of the segments.

In some embodiments, segment 1 502, may not be the start of a song, video, work or recording, but may represent the first spot or space in a recorded work that is available for insertion by a user of a selected variation. For example, a user may be presented with a first stanza of Mary Had a Little Lamb, where such first stanza includes the usual lyrics. The user may be presented with several variations of a first segment, that is actually the second stanza of the work, where such variations include different music, lyrics, tempo, etc. Similarly, the user may be presented with multiple variations of a third stanza from which to choose. Finally, the system may insert a final stanza without giving the user a choice of variations from which to choose.

In another embodiment, a system may present to a user a recording of Happy Birthday, and may designate a start point for a segment that starts with the end of "Happy Birthday dear". A user may be presented with an assortment of recordings of names from which may be selected a recording of a sung name that will be inserted into the segment. The end of the inserted segment may be the end of the recorded name, and the recorded work may continue with "Happy Birthday to you". The newly created work may include the recorded first part, the selected segment, and the recorded ending.

In some embodiments, the assembled variation, or signals associated with the assembled variations may be stored. The assembled variations in the form of a newly created work may be played, stored or distributed. In some embodiments, the assembled segments may constitute a newly created musical composition.

Figure 6:
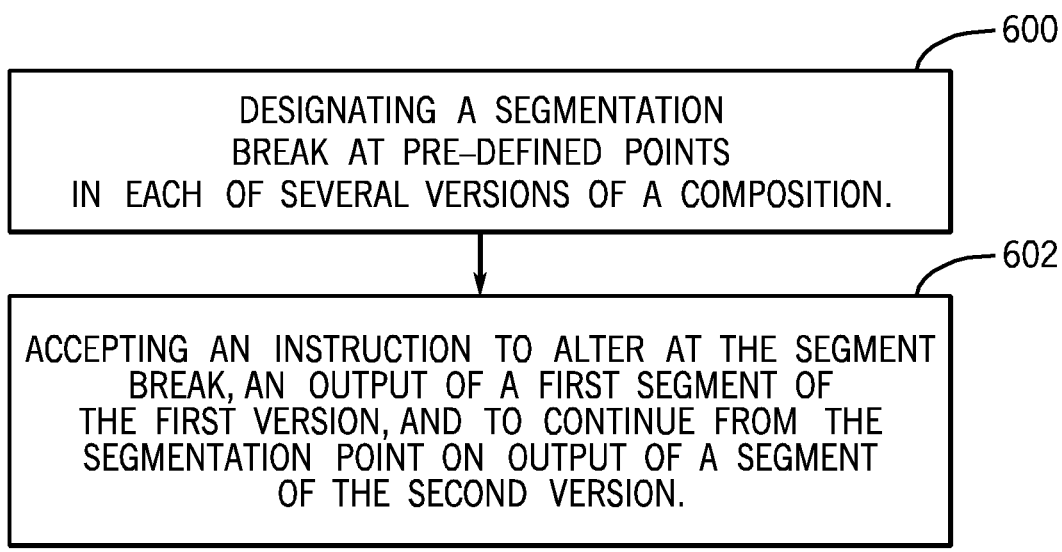
FIG. 6 is a flow diagram of a method in accordance with an embodiment of the invention.

Reference is made to FIG. 6, a flow chart of a method in accordance with an embodiment of the invention. In block 600, there may be designated a segmentation break at a pre-defined point in each of several versions of a composition. In block 602, an instruction may be accepted from, for example a user, to alter at the segmentation break, an output of a first segment of the first version, and to continue from the segmentation point an output of a segment of the second version.

Figure 7:
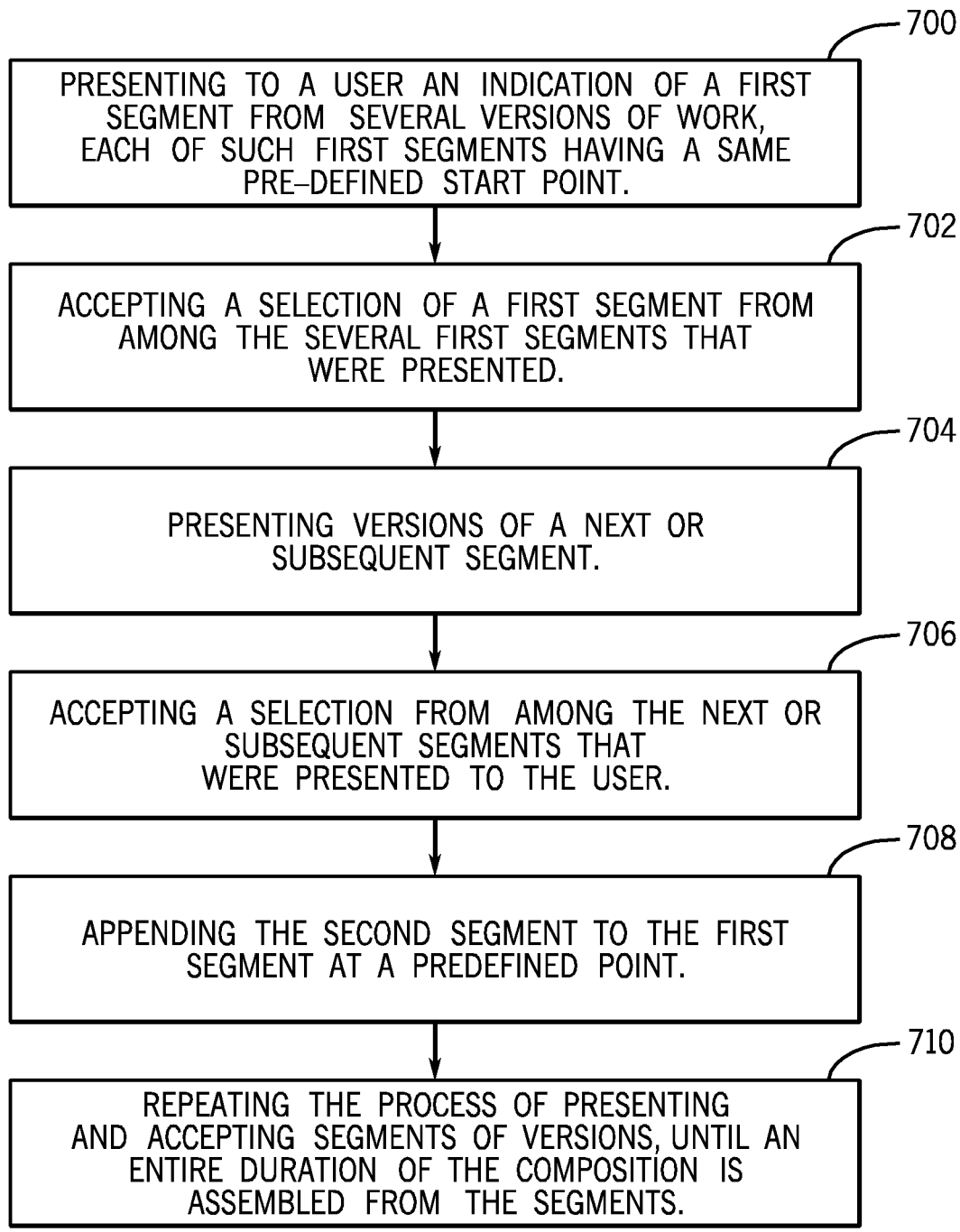
FIG. 7 is a flow diagram of a method in accordance with an embodiment of the invention.

Reference is made to FIG. 7, a flow chart of a method in accordance with an embodiment of the invention. In block 700, there may be presented to a user an indication of a first segment for several versions of a work, where each of such first segments has a same pre-defined start point. In block 702, there may be accepted from a user by for example a processor a selection of a first segment from among the several first segments that were presented from the versions. In block 704, there may be presented to for example a user several versions of a next or subsequent segment for one or more of the versions that were presented for the first segment. In block 706, there may be accepted from the user a selection from among the next or subsequent segments that were presented to the user. In block 708, the selected first segment may be appended, assembled or attached to the second segment at a predefined point so that a musical quality of the combination of the two segments is maintained. In block 710 the process of presenting segments of versions, accepting a selection of a segment and appending the selected segment to the prior segment may be repeated until an entire duration of the composition is assembled from the segments.

Figure 8:
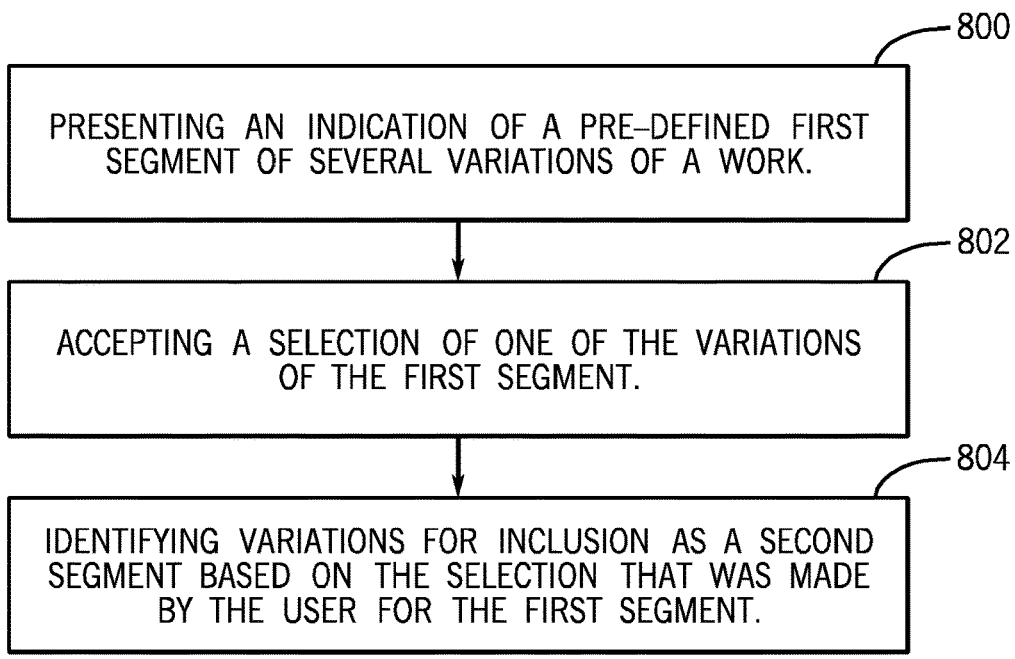
FIG. 8 is a flow diagram of a method in accordance with an embodiment of the invention.

Reference is made to FIG. 8, a flow chart of a method in accordance with an embodiment of the invention. In block 800, there may be presented to a user an indication of a pre-defined first segment of several variations of a work. In block 802, a processor may accept from for example a user a selection of one of the variations of the first segment. In block 804, the processor may select or identify several variations for inclusion as a second segment based on the selection that was made by the user for the first segment. For example, if a selected first segment is from a hip-hop version, the processor may present to the user various second segments that also have hip-hop sounds from different artists, or may include portions of different hip-hop songs from the same artist. In some embodiments, the processor may also present an indication of a relative suitability of the various presented second segments in light of the selected first segment, where from said first plurality for said first segment of said work.

Figure 9:
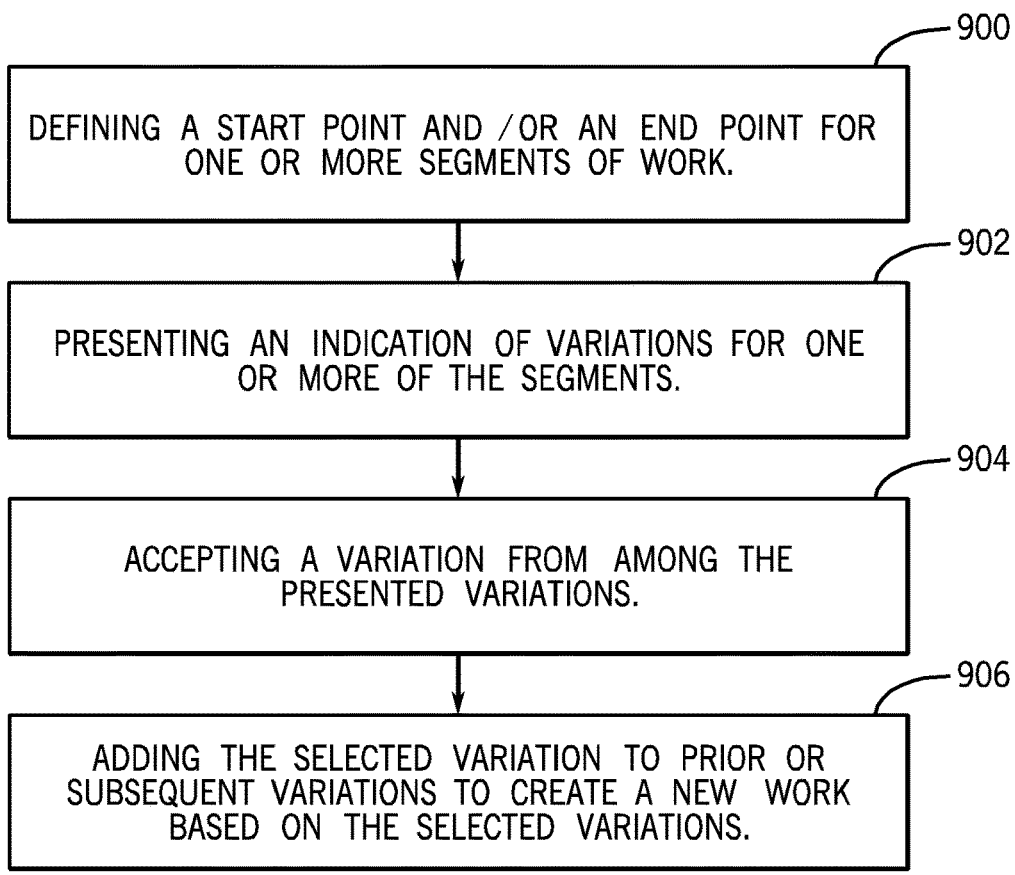
FIG. 9 is a flow diagram of a method in accordance with an embodiment of the invention.

Reference is made to FIG. 9, a flow chart of a method in accordance with an embodiment of the invention. In block 900, a start point and/or an end point for one or more segments of a work may be defined in a recording of the work. In block 902, an indication of several variations for one or more of the segments may be presented to a user. In block 904, a selection may be accepted for a variation from among the presented variations. In block 906, the selected variation may be added, combined or inserted into prior or subsequent variations to create a new work based on the selected variations.

In accordance with yet another embodiment of the invention, seamless assembly of video/audio segments is provided. To achieve such seamless assembly during streaming/online progressive download of media and/or during an interactive media, e.g., video presentation in real-time, a second segment is downloaded to a client, such as a user's personal computer or other computing device, during the presentation of a first segment. It should be noted that more than one segment may be downloaded in parallel. The first segment is then attached to the beginning of the second segment, where no jitter or gap results with the transition point either in the video or audio portion of the segments.

Hence, the merged segments are presented as a seamless assembly of video/audio segments, where the user is "unaware" that the merged segments are the result of two separate or different segments.

A video format such as the Flash video format "FLV" may contain several media streams, e.g., a video stream, an audio stream, and script (i.e., cue points). Native FLV files use the MP3 audio encoding format for their audio streams. However, MP3 encoded files contain at least several milliseconds of "silence" at the beginning of each file. Hence, the FLV format cannot provide seamless assembly of multimedia content. Therefore, and in accordance with embodiments of the invention, the audio stream in the original FLV file is replaced with audio encoded in the Ogg Vorbis format, resulting in a new gapless file format hereinafter referred to as an "FOV" format, where the audio may be seamlessly interleaved and assembled.

It should be noted that the media formats described herein are merely exemplary, and that other media formats may be utilized and/or altered in accordance with embodiments of the invention to achieve similar seamless assembly of content. For example, the F4V format (based on the ISO base media file format) may be similarly altered in accordance with embodiments of the invention to provide seamless assembly of multimedia content. Additionally, formats other than Ogg Vorbis that may allow for audio to be seamlessly interleaved/assembled can also be utilized.

Figure 10:
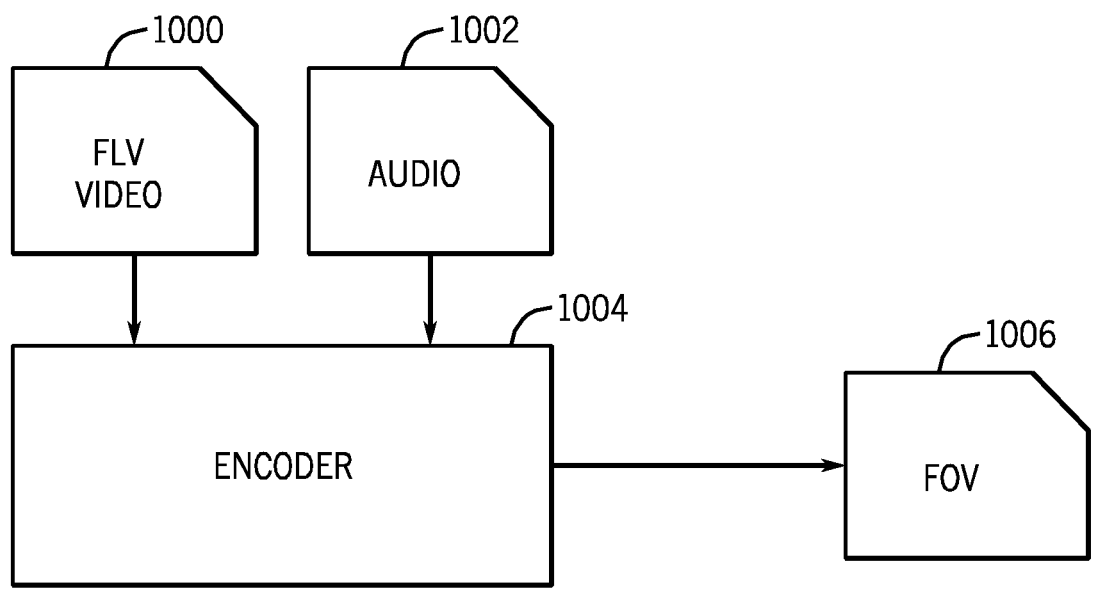
FIG. 10 is an exemplary representation of FLV file alteration utilizing an encoder in accordance with an embodiment of the invention.

Referring to FIG. 10, a representation of the FLV file alteration utilizing an encoder is shown. An FLV video stream 1000 and an audio stream 1002 are input into an encoder 1004. The encoder, as described in greater detail below, alters the original FLV video stream 1000 to output a gapless FOV video stream 1006. The encoder 1004 may be hardware, software, or a combination thereof. Additionally, the encoder 1004 may be implemented at, e.g., a content provider server, content source, or the like to provide the FOV video stream/file to a multimedia player.

Figure 11:
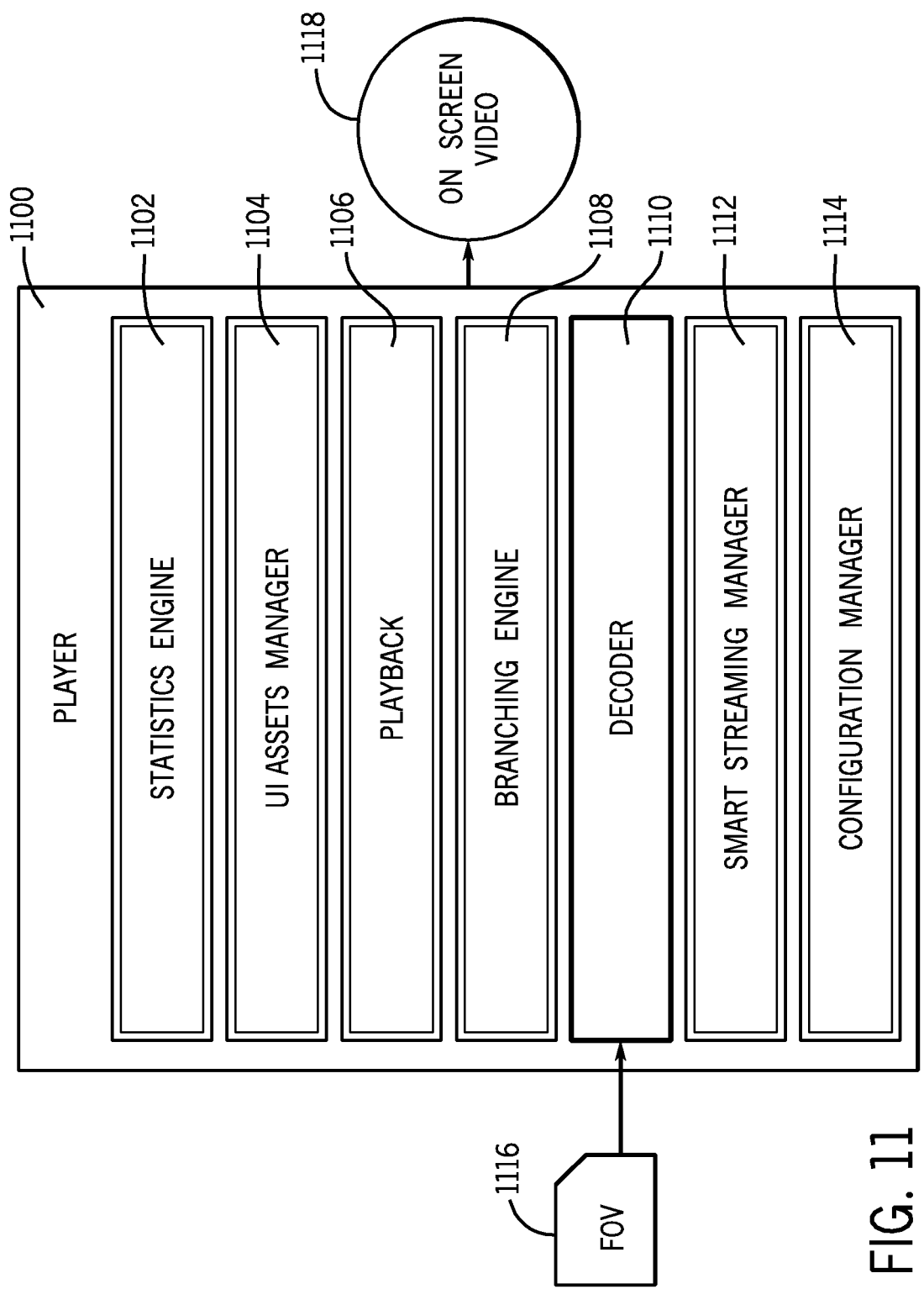
FIG. 11 is an exemplary representation of a player that may be used to present multimedia content by rendering a gapless FOV file in accordance with an embodiment of the invention.

FIG. 11 illustrates a player 1100 that may be used by a user at, e.g., a client device, such as the user's computer or other computing device for rendering a gapless FOV multimedia file. The player 1100 may be implemented as, e.g., a standalone application, having multiple functions, such as a statistics engine 1102 for collecting any and/or all events and choices made by a user, and a user interface (UI) assets manager 1104 for handling the interactivity layer and skinning features in accordance with various embodiments of the invention. The player 1100 may also include a playback function 1102, where the different video segments may be merged into a single video/audio stream, as well as a branching engine 1104 utilized to connecting user choices to appropriate video segments in real-time as discussed above. The player 1100 further may include a smart streaming manager 1106 for handling the intelligent pre-loading and runtime buffering and trimming, as well as a configuration manager 1108. The player 1100 also includes a decoder 1112, that is again, executable, for example on a client computer/machine, that decodes an incoming FOV stream 1110 to separate the video and audio streams and outputs them in a synchronized manner as an on screen video 1114. It should be noted that more or less features/elements can be included or excluded from the player 1100. For example, and as indicated above, a user may be given the ability to, e.g., pause, rewind, forward, etc., through a rendered file, such as the on screen video/interactive media.

Referring back to the encoder 1004, encoding of a gapless video stream in accordance with embodiments of the invention involves synchronized multiplexing of a video file with a new audio file and script tags. A standard FLV file container includes video tags (i.e., a complete video presentation divided into tags), audio tags (i.e., a complete audio presentation divided into tags), and script tags. Script tags are configured to hold the video metadata, i.e., scripts that connect with the player 1100 to effectuate proper presentation of the video.

Figure 12:
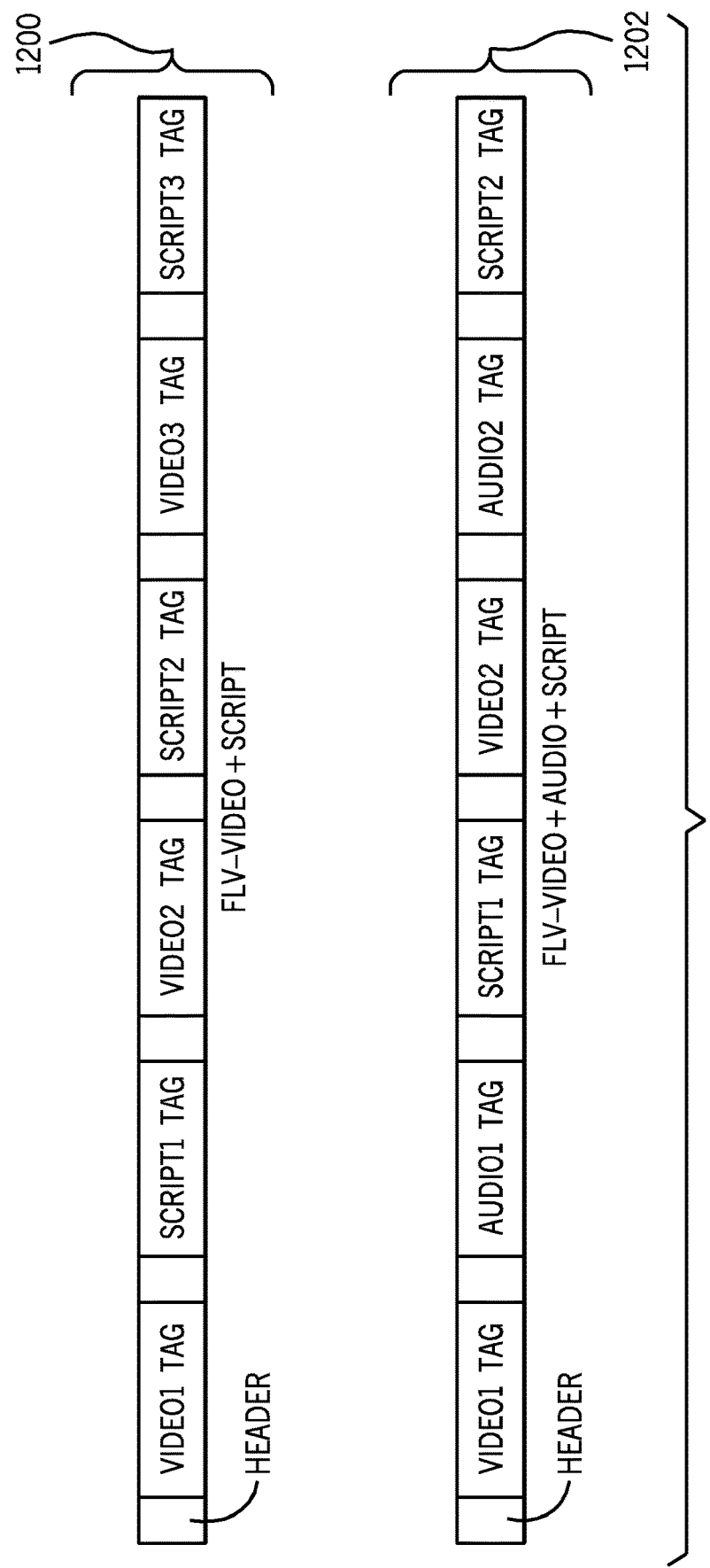
FIG. 12 is an exemplary file structure of FLV files representative of video segments.

FIG. 12 illustrates the file structure of exemplary FLV files representative of the aforementioned video segments. FLV file 1200 includes video tags and script tags, without audio tags, in addition to a header file/portion. FLV file 1202 includes video tags, script tags, a header, and the conventional audio tags, each associated with their respective video and script tags. For example, a segment may be a video segment lasting, e.g., 10-30 seconds, while a tag lasts on the order or milliseconds (depending on the video frame rate), although segments and tags may be configured to last any desired period of time suitable for the purposes of the desired content presentation. It should be further noted that the tags are part of streamed data rather than "separate" files in and of themselves. Hence, connecting two audio tags, for example, is akin to joining two parts of an audio file, rather than connecting two separate playable audio files.

To create a gapless FOV file with the encoder, an FLV file without audio/audio tags is utilized. The file structure of the FLV file is analyzed by reading the file header, video tags, and metadata to determine how to divide the associated audio stream into synchronized gapless audio tags that can be properly synchronized with the video stream (specifically, video timestamps).

Figure 13A:
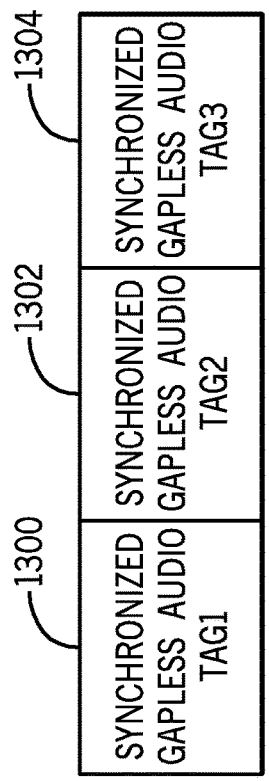
FIG. 13 is an exemplary file structure of an FOV file representative of a video segment created by an encoder in accordance with an embodiment of the invention.
Figure 13B:
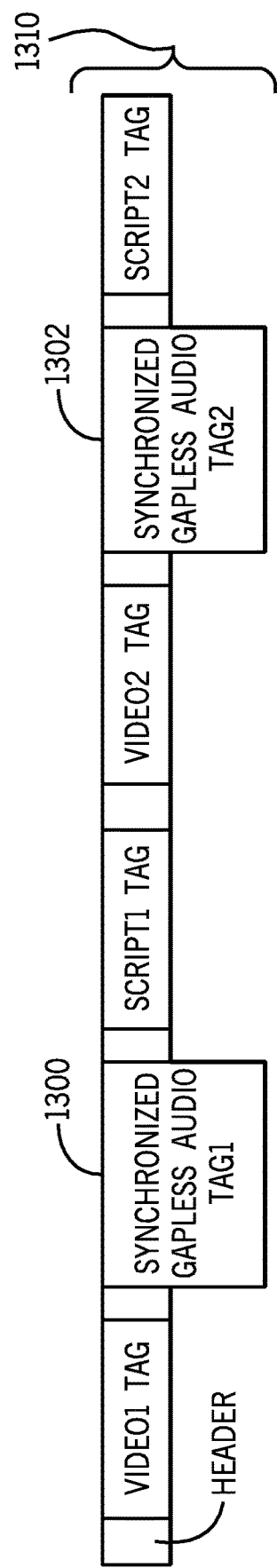

FIG. 13a illustrates a complete audio stream (e.g., the audio of a video segment) divided into 3 audio tags, 1300, 1302, and 1304. It should be noted that the audio stream structure illustrated in FIG. 13a, though not shown, may also include certain headers and small script tags of its own. FIG. 13b illustrates the file structure of an FOV file 1310 representative of a video segment, where the synchronized audio tags 1300, 1302, and 1304 have been interleaved into a timeline with the standard FLV video and script tags, effectively multiplexing the FLV and Ogg Vorbis files. Hereafter, different video segments may be combined as described above, where the combined video segments experience no gap or jitter between the transition from one video segment to another. It should be noted that the order of the video tags, synchronized gapless audio tags, and script tags is not necessarily constant as illustrated in the exemplary FOV file 1310. That is, the various tags can be encoded in any order so long as the appropriate streaming for all of the tag types is maintained.

In accordance with certain embodiments of the invention, the encoder creates an FOV file for each video segment that is/may be presented or played. Each of the FOV files has a file header and tags as illustrated in, e.g., FIG. 13b. Additionally and as also described above, complete gapless audio, e.g., the Ogg Vorbis-encoded audio associated with the video, is divided into synchronized gapless audio tags that can be synchronized with video timestamps such that if an FOV file is stopped/cut at any point within its file structure, both the audio and video streams will reach the same or at least approximately the same point on the playback/presentation timeline.

Figure 14:
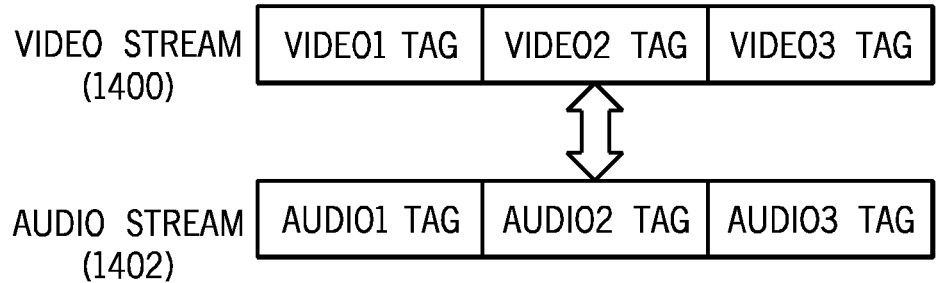
FIG. 14 is an exemplary representation of a video stream and audio stream synchronization via a decoder in accordance with an embodiment of the invention.

To playback/present an encoded FOV file, a decoder, such as decoder 1112 described above, is utilized to translate the FOV formatted file into playable video and audio streams. It should be noted that a standard, e.g., Flash, player, will not be able to playback/present the FOV file as the multiplexing performed to create the FOV file makes it incompatible with players without the use of the decoder. The decoder in accordance with embodiments of the invention synchronizes the video and audio streams received to play seamless and sequential video segments. As illustrated in FIG. 14, the video stream 1400, with its component video tags Video1 tag, Video2 tag, Video3 tag, etc. is synchronized with their respective audio tags, Audio1 tag, Audio2 tag, Audio3 tag, etc.

Figure 15:
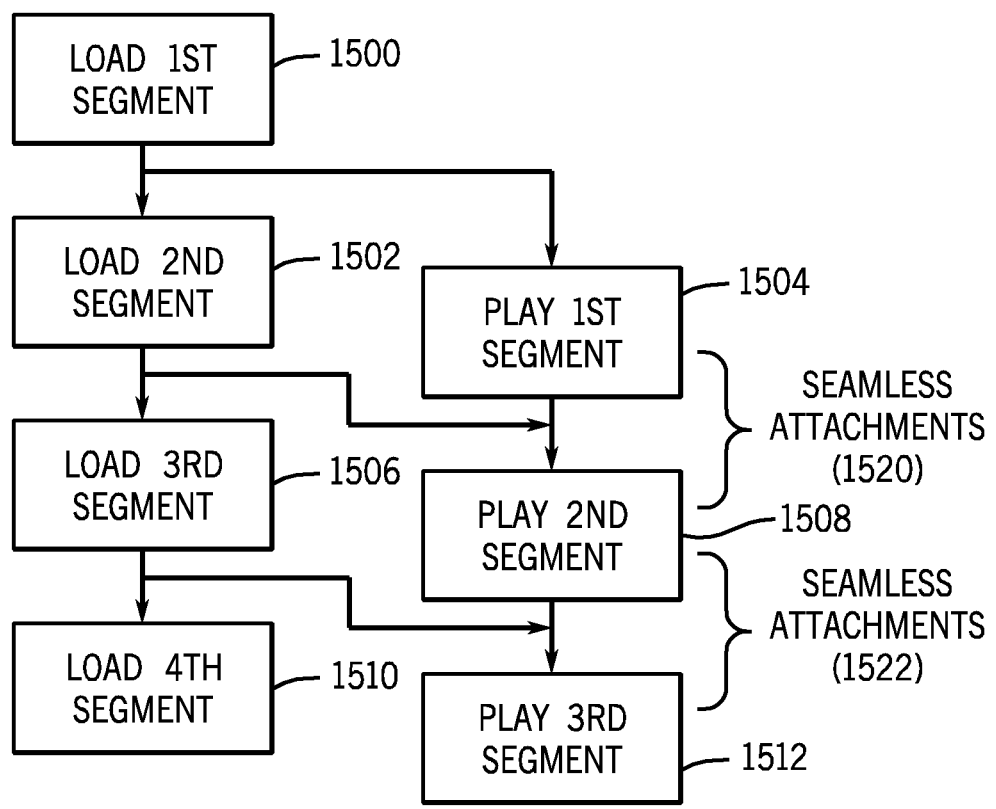
FIG. 15 is an exemplary flow diagram illustrating the playback of sequential video segments in accordance with an embodiment of the invention.

FIG. 15 is representative of an exemplary flow diagram illustrating the playback of sequential video segments. At step 1500, a first segment is loaded. At step 1502 a second segment is loaded while the first segment is played at step 1504. At step 1506, a third segment is loaded while the second segment is being played at step 1508. At step 1510, a fourth segment may be loaded while at step 1512, the third segment is played. That is, subsequent segments may be loaded in parallel/at least partly in conjunction with the playback of previous segments. As also shown, seamless attachments 1520 and 1522 are made between the various segments upon playback by virtue of the FOV file structure and synchronized gapless audio tags utilized therein to effectuate continuous playback.

Figure 16:
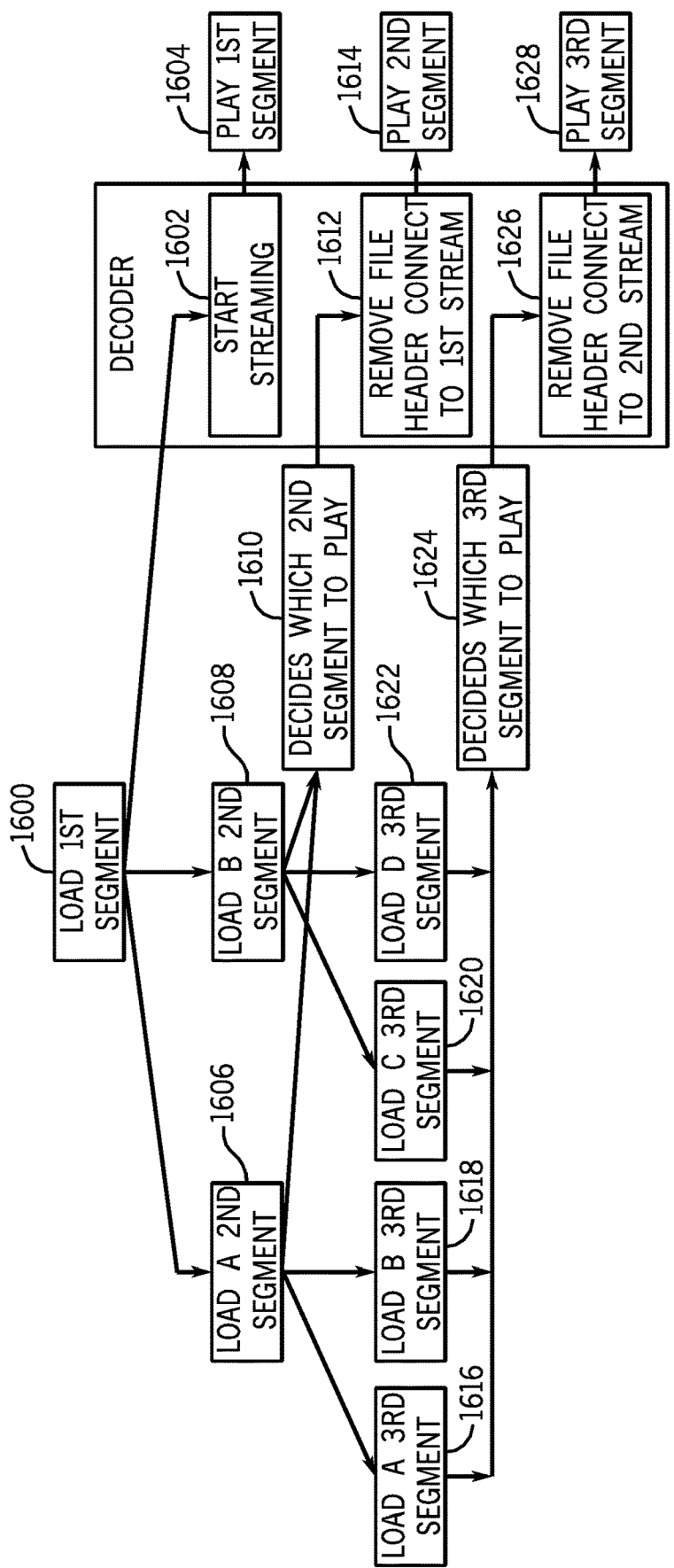
FIG. 16 is an exemplary flow diagram illustrating the playback of sequential video segments during an interactive video session in accordance with an embodiment of the invention.

FIG. 16 is an exemplary flow diagram illustrating the playback of video segments in the context of an interactive video as described previously and in accordance with some embodiments of the invention. At step 1600, a first video segment may be loaded. At step 1602, the decoder starts streaming the loaded first video segment, and at step 1604, the first video segment is played. At steps 1606 and 1608, alternate second video segments are loaded, such that a user may choose at step 1610, which of the alternate second video segments is to be sequentially played after the first video segment. Upon a choice to play either of the second video segments, the decoder removes the FOV file header of the chosen second video segment and attaches this video segment to the first video segment seamlessly. Additionally, the decoder changes headers of the actual tags (e.g., video and audio tags), so that the tags will "appear" at the correct time in the video timeline, and the player layer (which plays the video stream) will see two video segments as a single stream. At step 1614, this second video segment is played without any jitter/gap as would conventionally be experienced. At steps 1616, 1618, 1620, and 1622, alternate third video segments are loaded. As before, at step 1624, one of the alternate third video segments is chosen for playback and at step 1628, the decoder removes the FOV file header of the chosen third video segment and seamlessly connected to the second video segment being streamed. At step 1628, the third video segment may be played. As described above, the seamlessly assembled video segments may, in addition to being played, be rewound through, forwarded through, paused, etc.

In accordance with yet another embodiment, seamless assembly of video/audio segments as previously described may also be implemented in the context of wireless devices, such as cellular telephones, mobile tablet PCs, etc., for example, utilizing the Apple®/Cisco® iOS® platform/software. However and in contrast to the seamless assembly described above, which may occur during progressive media download, files may be downloaded completely prior to real-time decoding.

In accordance with yet another embodiment of the invention, systems and methods are provided to allow for data mining in the context of the interactive video/multimedia content presentation discussed above. Interactive video may be implemented as, e.g., a web-based application hosted on a server, such as a content server, executable on a local user machine, e.g., a personal computer connected to the server via a data network, such as the Internet. Alternatively, interactive video may, as described previously, be effectuated as a standalone application, as long as the local user machine can connect to a back-end/back office system as will be described in greater detail below. Interactive video may refer to any type of media/multimedia presentation that allows for merging or blending interaction, via, e.g., a user, and more linear aspects of the media. For example, interactive video may allow one or more aspects of the presentation to be added to, deleted from, substituted, or otherwise altered in some way. Data mining may refer to one or more processes associated with extracting data or patterns from data, and/or analyzing captured data and transforming or summarizing such data/data patterns into information that may be useful for various purposes.

In an "active" mode, the interactive video system chooses a selected option according to user inputs (e.g., mouse, keyboard, voice, hand movement(s), eye movement(s), and/or any other appropriate manner of user input). For example, if a user chooses certain versions or variations of a video or recording to create a new work, the choices made by the user that are indicative of the particular version(s) or variation(s) to be combined into the new work are reflected by the options that are selected by the system. Moreover, certain decision points may be configured such that available options to the user are only revealed/displayed upon the user "hovering" over, clicking, or otherwise interacting with the decision point. Alternatively, decision points may be automatically presented at desired times/points during a media presentation. If the user does not make a certain choice during the interactive video, the system chooses an option on behalf of the user either randomly or in accordance with one or more default settings/choices, where the default settings/choices can be different or the same for every interactive video session.

In a "passive" mode, the system chooses an option for the user without giving the user the ability to make any choices. Such a passive mode may be implemented, e.g., during the replay of a user-created work that was created during a previous interactive video session, for example, or during the playback of a work created by another user. Further still, the interactive video system may act in a passive mode by making choices on the user's behalf according to other inputs and/or parameters besides those that are made by the user and/or are not visible to the user. For example, passive mode choices can be made during an interactive video session based on a user's current location, weather, user selections/choices made during a previous interactive video session, or simply other user data such as that taken from a user profile such as a Google™ account, a Facebook® account, an account with the interactive video service provider, etc. Additionally still, such inputs can affect what options may be presented to the user, whether in an active mode or passive mode. For example, if the weather applicable to a user is known, options can be presented based on the current weather, e.g., certain advertising may be presented based on the current weather. It should be noted that these passive mode choices are merely exemplary and not meant to be necessarily limiting in any way.

It should further be noted that alternatively to the interactive video context described herein, data mining in accordance with an embodiment of the invention may be achieved in the context of a cataloged video system that allows for the creation of, e.g., a coherent and seamless collection of videos or media.

Referring back to FIG. 11, the player 1100 that a user may utilize to interact with the interactive video system and/or play a created work includes the statistics engine 1102. The statistics engine 1102 is operable to record or log any or all events witnessed and/or encountered by the player 1100. It should be noted that the term statistics engine may refer to one or more mechanisms or algorithms or implementations/instances thereof utilized in various embodiments to gather data such as that described above for the purpose of data mining. That is, any actions or events that a user may perform or engage in may be recorded by the statistics engine 1102. For example, if a user starts playback of an interactive video, a start playback event is recorded by the statistics engine 1102. If a user selects a particular option during an interactive video sessions, such as choosing a second video segment to be played with a first video segment, the choice of the second video segment is recorded along with the identity of the user and/or the identity (e.g., Internet Protocol (IP) address) of the user's local machine upon which the player 1100 is running Other events or actions such as "end screen events," "button events" (such as actuating play, stop, rewind, etc. buttons on the player 1100), etc. may also be recorded. Additionally, any information or other data that is presented to or accessible by the player 1100 may also be recorded by the statistics engine 1102. As described above, given the identity of the user and/or the user's local machine, information such as the user's location may be determined, as well as any other relevant data associated with the user/local machine can be recorded by the statistics engine 1102. For example cursor movement or a user's physical movements such as eye movement or body movement may also be recorded by the statistics engine and/or used.

Figure 17:
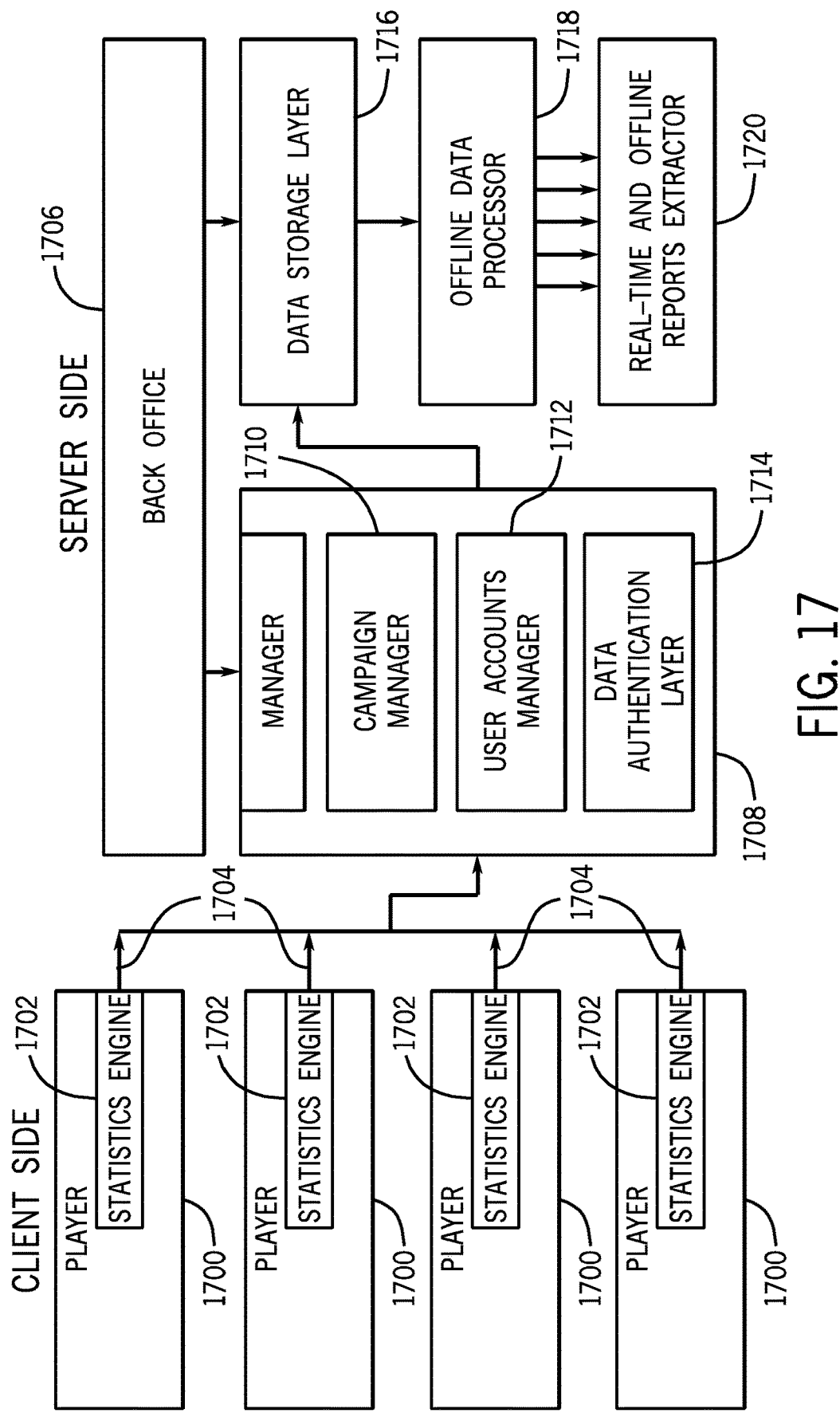
FIG. 17 is an exemplary representation of a data mining system architecture in accordance with an embodiment of the invention.

FIG. 17 is an exemplary representation of the interactive video system architecture. On the client side, multiple users may have multiple players 1700 operating on their local machines. As discussed above, each of the players 1700 has a statistics engine 1702 running therein. Upon the occurrence of an event, the statistics engine 1702 sends a request over the Internet or other suitable data network in the form of, e.g., a Hypertext Transfer Protocol (HTTP) request, to a manager 1708 on the server side of the interactive video system. As illustrated in FIG. 17, the server side of the interactive video system may include a back office server(s) 1706 that controls or includes the manager 1708 as well as a database (not shown) controlled or accessible by a data storage layer 1716, as well as an offline data processor 1718 for, e.g., analyzing and processing any stored data associated with the recorded events. The server side of the interactive video system may also include a real-time and offline reports extractor 1720 for generating and presenting statistics reports regarding the recorded events to interested parties such as the interactive video system provider, or other entities such as advertising or marketing entities associated with the interactive video system provider.

The request sent by the statistics engine 1702 to the manager 1708 may contain certain details including a campaign identity, user details, e.g., the platform of the user's local machine upon which the player 1700 is being run, location, IP address, account information if available, etc., and any event details. The manager 1708 may be implemented as hardware, software/application, or a combination thereof to effectuate a service that is hosted on the server side domain that receives the requests sent by the statistics engine 1702, checks and/or analyzes the requests, and then saves the requests to a database. The checking and/or analyzing of requests is performed in accordance with one or more predefined configurations created for each campaign and/or according to other user details that may already exist in the interactive video system. To perform the requisite checking and/or analysis of received requests, the manager 1708 includes at least a campaign manager 1710, a user accounts manager 1712, and a data authentication layer 1714, each or all of which may communicate with the data storage layer 1716 for storing event/event-related data recorded by the statistics engine 1702. The campaign manager 1710 may contain and/or control the one or more predefined campaign configurations, while the user accounts manager 1712 may control/access any user information that may be relevant to and/or utilized in conjunction with recorded events as described above. The data authentication layer 1714 may be utilized to ensure that any data received in a request from the statistics engine 1702 complies with any data requirements on the server side of the interactive video system, or that, e.g., authorized users or using an instance of the player 1700. A report extractor can create certain calculation and reports in the background without any user request (it's called CRON JOB). So that some reports will be ready immediately while receiving such a request.

Further still, the back office server(s) 1706 may be configured to utilize, e.g., a smart algorithm, implemented as part of the manager 1708 or at the offline data processor 1718. As part of the manager 1708, this smart algorithm may be utilized to analyze user selections between data regarding such selections is stored in the database. As part of the offline data processor 1718, the smart algorithm may be utilized to analyze core or "essential" aspects of the data to be used in reports.

It should be noted that the location and/or elements of the interactive video system may vary. For example, and alternatively to the embodiment described above, a music store may utilize a standalone kiosk that potential customers can use to preview music videos and choose to create their own desired versions/variations of songs/music videos. Hence, the client side and the server side may reside together in the kiosk as a single, local system. Alternatively still, multiple kiosks may be located in a music store, each with a standalone instance of the player 1700, and each connected via a data network to a music store server system.

A campaign in the context of various embodiments of the invention may refer to a marketing campaign associated with a particular work that may be hosted on the interactive video system. For example and in accordance with earlier-discussed scenarios, a video may be presented to a user, where different versions of the video may be chosen by the user such as an acoustic song version, a hip-hop version, and an electronica dance version. The marketing campaign may be utilized by a recording company to determine demographic statistics on the type of versions most/more-often chosen by users. If users in a particular locale appear to chose the hip-hop version of a video most often, the recording company may choose to market hip-hop type music more strongly in that particular locale. As another exemplary scenario, different video segments of an interactive music video may allow a user to choose scenes involving certain product brands that may be displayed in particular video segments. If a particular video segment is chosen more often than another video segment, this statistic may evidence that the product brand featured in the more-often chosen video segment is more popular to certain users.

Figure 18:
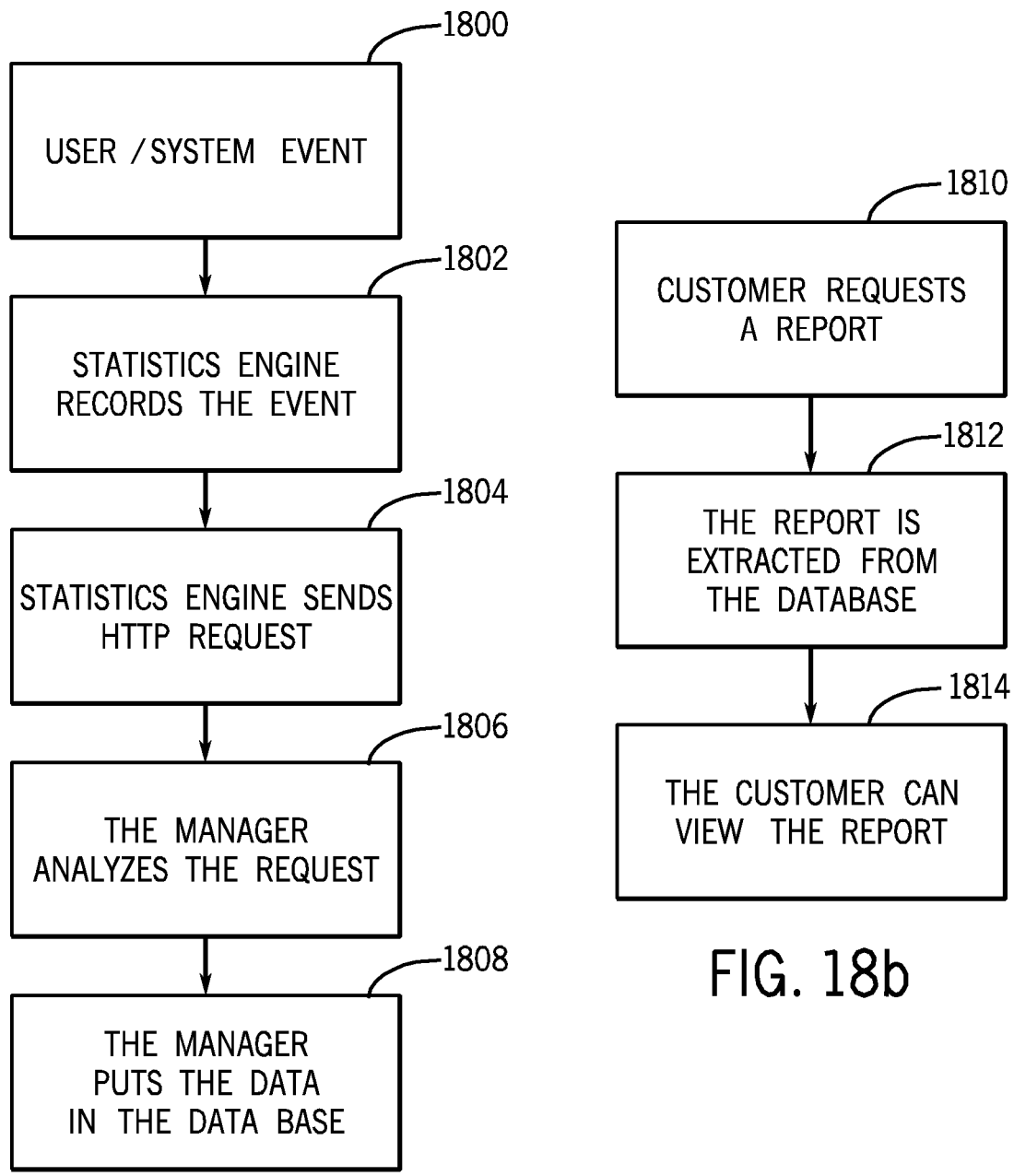
FIG. 18a is an exemplary flow chart illustrating processes performed triggering and recording a user/system event and information associated therewith in accordance with an embodiment of the invention.
FIG. 18b is an exemplary flow chart illustrating processes performed to request and extract a data mining report in accordance with an embodiment of the invention.

FIG. 18a is a flow chart illustrating exemplary processes performed to achieve data mining in accordance with an embodiment of the invention. At step 1800, a user/system event occurs, and at step 1802, the statistics engine records the event and/or data associated with the event. At step 1804, the statistics engine sends an HTTP request to the manager including any requisite or relevant data associated with the recorded event. At step 1806, the manager analyzes the HTTP request, and at step 1808, the manager stores some or all desired data received in the HTTP request in a database. It should be noted that more or less processes may be performed in accordance with various embodiments of the invention.

FIG. 18*b* is a flow chart illustrating exemplary processes performed to create a data mining report in accordance with an embodiment of the invention. At step 1810, a request from a customer may be received. In the context of data mining reports, a customer may refer to the aforementioned marketing or advertising entities, or any other entity that created, e.g., a particular campaign, and having a desire to access/view the statistical information gathered based on events recorded by the interactive video system. At step 1812, one or more reports is extracted from a reporting database (which may be the same or different from the database storing "raw" data that was received from the statistics engine 1702). That is, the offline data processor 1718 may analyze the received raw data for conversion or processing into one or more reports. The real-time and offline reports extractor 1720 retrieves such reports for the requesting customer for presentation at step 1814. It should be noted that depending upon the size of the database(s) and/or processing power of the back office server(s) 1706 and its component elements, such as the manager 1708, the offline data processor 1718, etc., the ability to extract reports in real-time may be affected. That is, "simpler" reports may be extracted in real-time, whereas more "complicated" reports, such as cross-campaign reports, may require more time to create, and hence may not be able to be retrieved in real-time.

Figure 19:
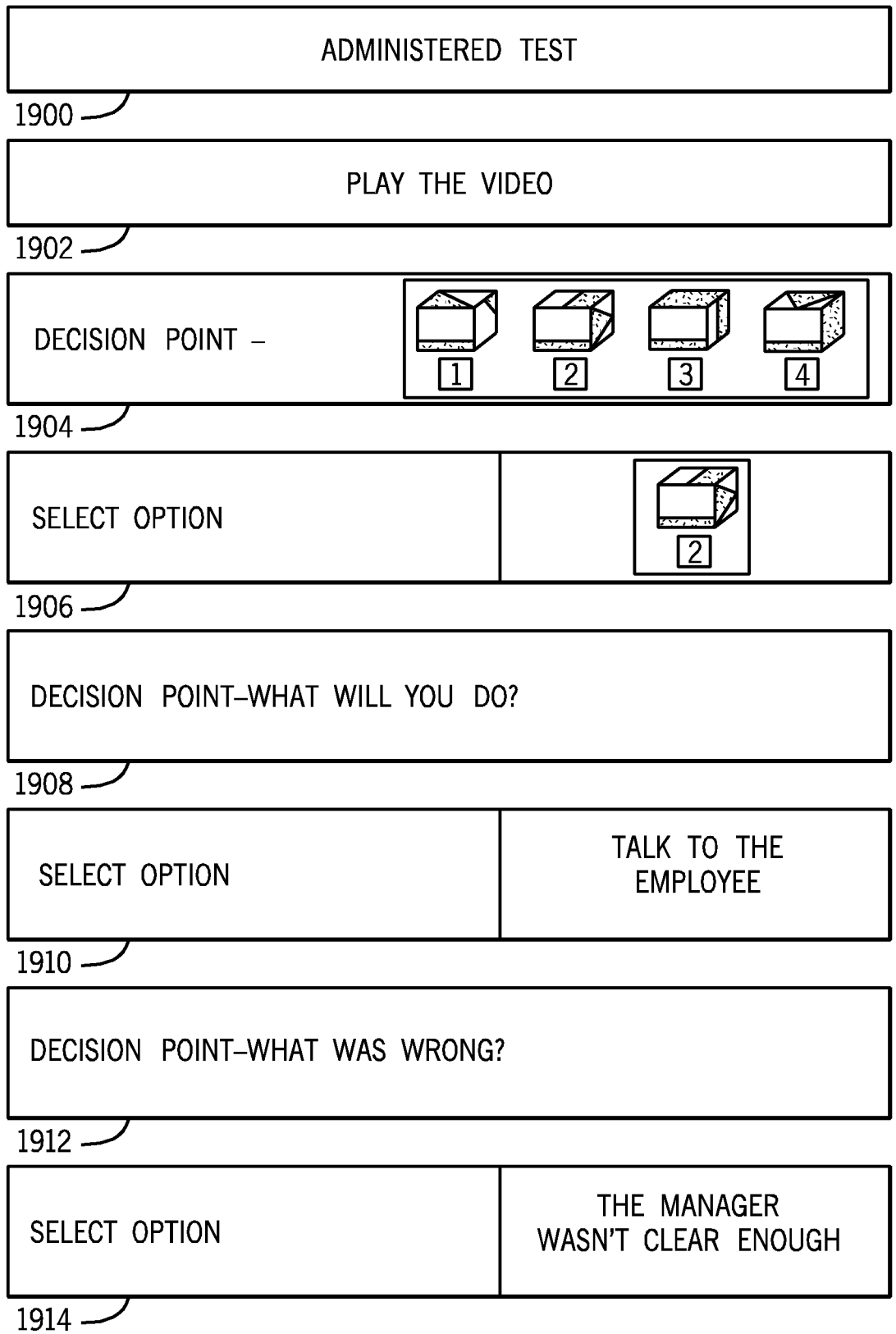
FIG. 19 is an exemplary user log created in accordance with an embodiment of the invention.

FIG. 19 is an example representation of a user log that can be created in accordance with an embodiment of the invention. As an alternative to the music video context of interactive video discussed above, the interactive video may be used for other purposes, such as the administration and checking of a test. That is, an administered test 1900 may be adapted to examine proper responses/reactions to situations that may occur in the workplace. For example, the video test may be played at step 1902. At step 1904, the video test may present a decision point to the examination taker via a player. The decision point may include 4 options indicative of a hypothetical work scenario that the examination taker may choose. At step 1906, the examination taker may select option 2 as his/her choice. At step 1908, an decision point may be presented to the examination taker asking the examination taker what he/she would theoretically do in a particular situation. At step 1910, the examination taker may indicate that his/her desired response to the particular situation would be to "talk to the employee." At step 1912, a subsequent decision point may be presented to the examination taker asking the examination taker to describe what was wrong in the particular situation that required the examiner taker to speak with the employee. At step 1914, the examination taker may select an answer indicating that "the manager wasn't clear enough" to the employee. Based on the various options/responses made by the examination taker, the examination taker can be evaluated as to whether or not he/she approached the hypothetical work scenarios in the correct manner/using the correct work procedures. It should be noted that because the examination taker is responding to/making selections using real-time video interaction, the examination taker or participant answers are likely to be more psychologically accurate in comparison to conventional methods of examination.

Figure 20:
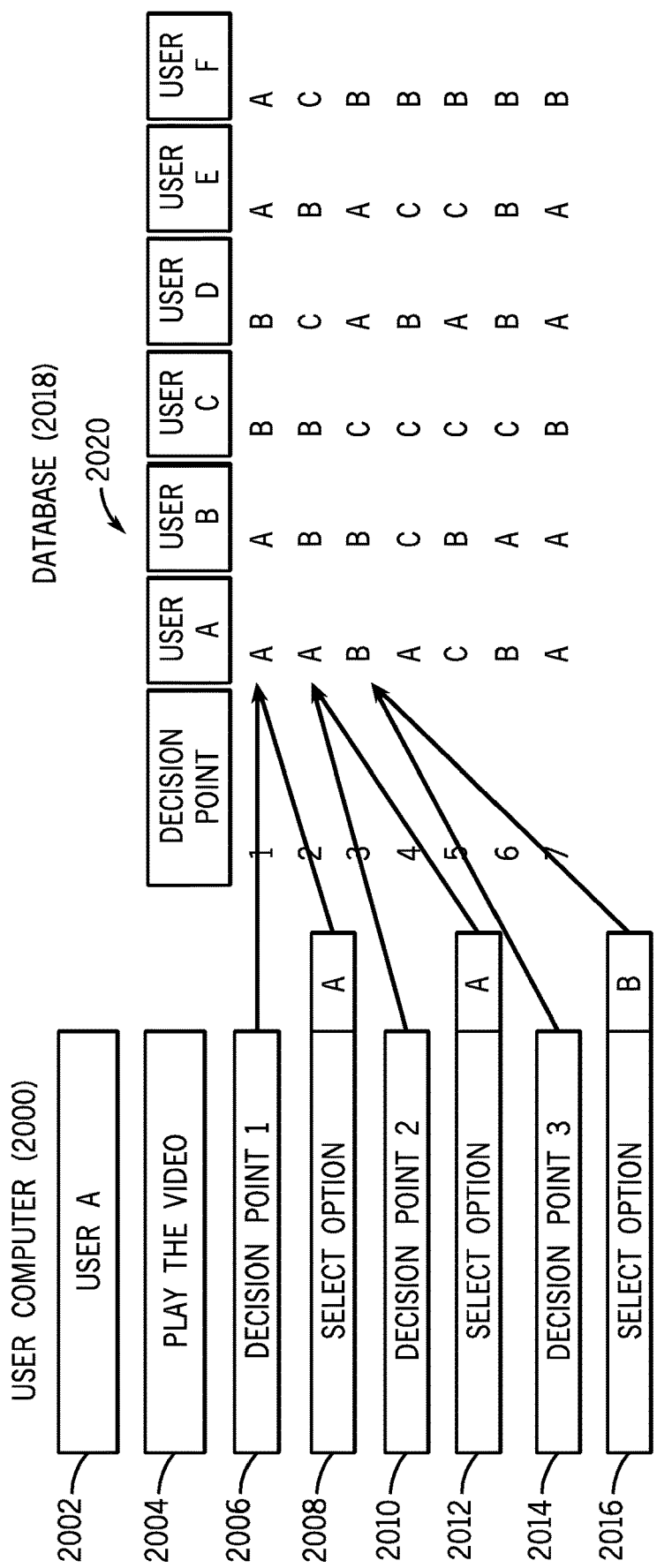
FIG. 20 is an exemplary representation of the creation of a campaign log in accordance with an embodiment of the invention.

FIG. 20 illustrates an exemplary procedure for entering events into a database for data mining purposes in accordance with an embodiment of the invention. A user computer 2000 operated by a User A 2002 may play a video at step 2004. In response to a first decision point 1 presented at step 2006, the User A 2002 may select an option A at step 2008. The decision point 1 and the selected option A chosen by User A 2002 is recorded in a log/table 2020 residing in database 2018. At step 2010, a second decision point 2 may be presented via video to the User A 2002, whereupon User A 2002 may select option A at step 2012. Again, the decision point 2 and the selected option are stored and reflected in the log/table 2020. At step 2014, yet another decision point 3 may be presented to User A 2002, and in response, User A 2002 may select an option B at step 2016, each of which is recorded on the log/table 2020. As also illustrated in log/table 2020, other users and their selections in response to, e.g., the same decision points 1, 2, 3, etc. are also recorded on the log/table 2020. Hence, once completed, the log/table 2020 is indicative of campaign-wide log. It should be noted that depending on the predefined campaign configuration or requirements, if a user plays a video multiple times, the statistics engine may record each selection made by the user each time the video is played/interacted with. In other instances, only events associated with a first playing/interaction with the video (or any other group of plays) may be logged. For example, and based upon knowledge of the identity of a particular user, the manager is able to determine whether the same user and/or the same instance of the player is associated with particular interactions with an interactive video.

Figure 21A:
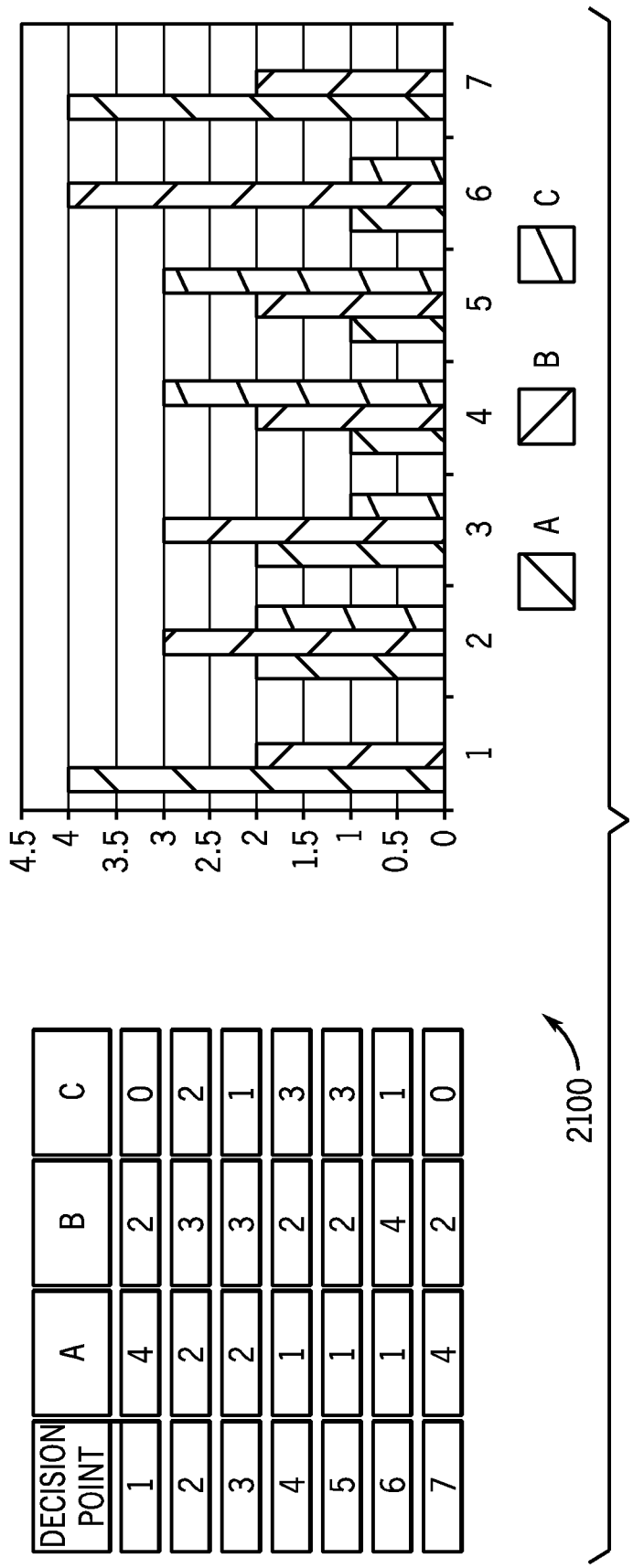
FIGS. 21a and 21b are exemplary representations of global and specific data mining reports in accordance with an embodiment of the invention.

Based on the accumulated logs, whether single-user or campaign-wide or cross-campaign-wide, reports can be generated. FIG. 21*a* illustrates one example of a global report based upon responses from at least several Users A, B, and C, and their respective selections/events based on multiple decision points. A global report in the form of a bar graph may then be generated for presentation. Alternatively, more specific reports can be generated. For example, FIG. 21*b* illustrates a pie chart of the sixth decision point focused only on those users that chose selection option A at the first decision point of the campaign.

Figure 21B:
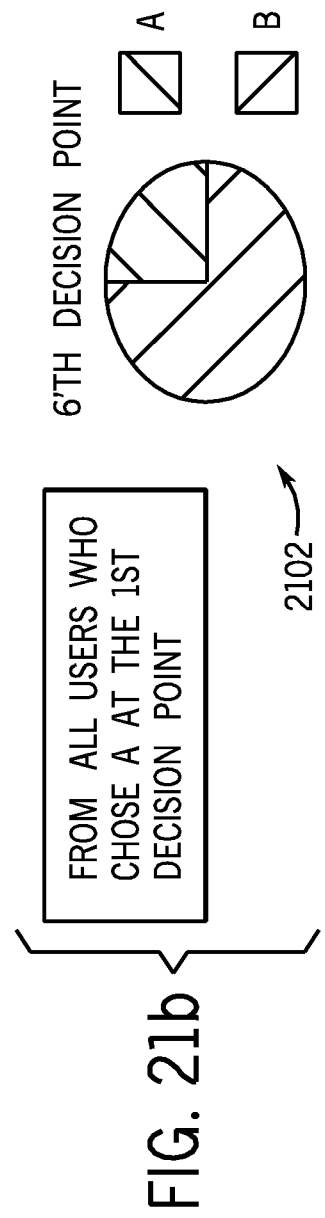
Figure 22:
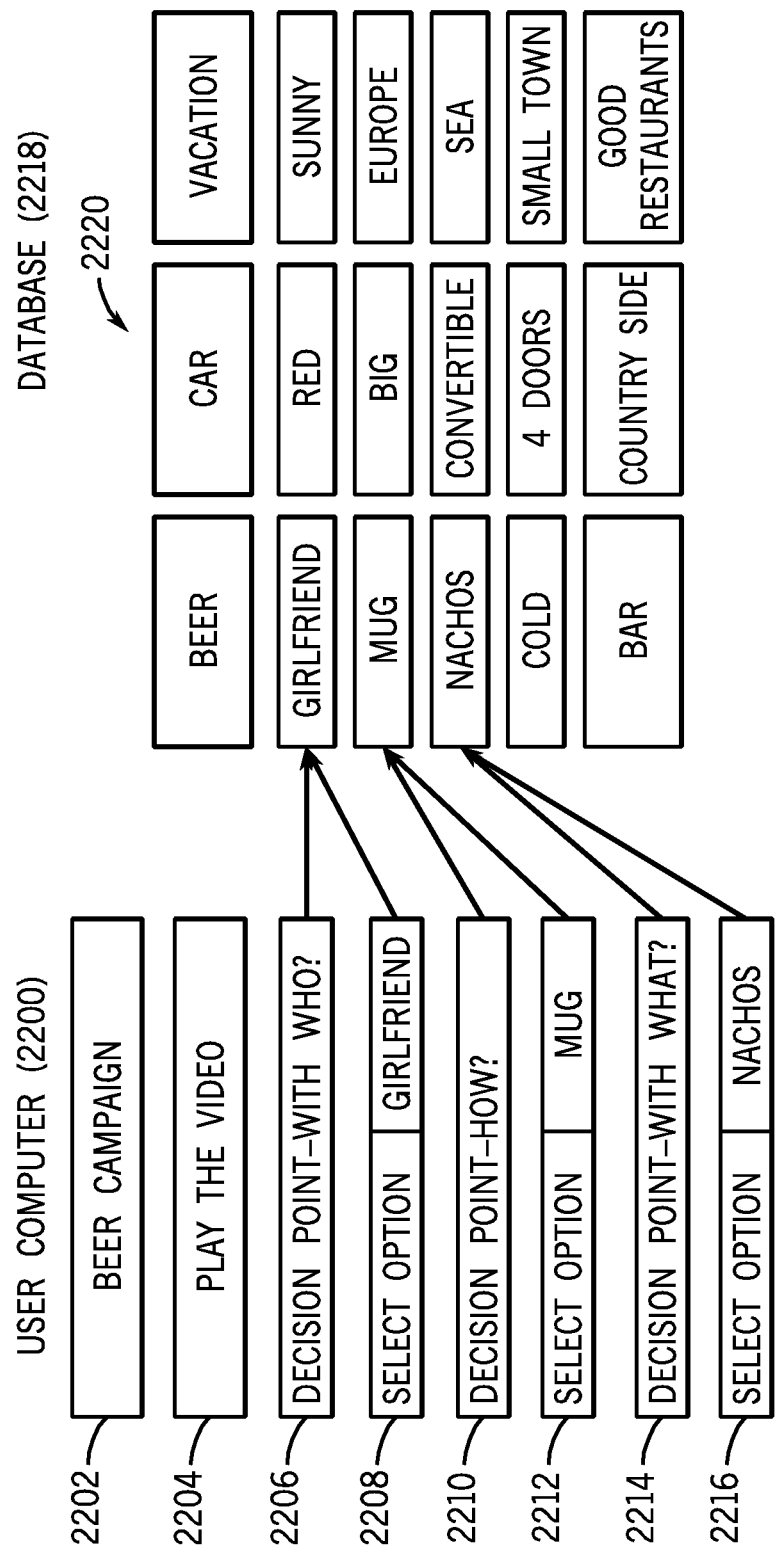
FIG. 22 is an exemplary representation of the creation of a cross-campaign log/report in accordance with an embodiment of the invention.

It should be noted that as in the example illustrated by FIG. 21*b*, reports can focus and retrieve data from a campaign-wide log, or the report can be based solely on, e.g., a single user's recorded events, where each user/user interaction may be treated as a campaign in and of itself. It should be further noted that a user can be identified by, e.g., an IP address of the user's local machine, account information from other services, such as a Google™ account, a Facebook® account, an account with the interactive video service provider, etc., or any other process available for user identification. Using a user's identity, cross-campaign statistics can be obtained. FIG. 22, for example, illustrates a cross-campaign log, where a user computer 2200 is utilized by a user to interact with a beer campaign 2202. At step 2204, a video associated with the beer campaign 2202 is played. A first decision point is presented to the user via the video at step 2206, in this instance asking who the user drinks beer with. At step 2208, the user may answer that he/she drinks beer with his/her girlfriend selecting the corresponding option indicative of a girlfriend choice. It should be noted that making a choice/selection in accordance with various embodiments may be effectuated by "selecting" an option via hand movements, utilizing a computer mouse, or entering some other appropriate input. At step 2210, a second decision point may ask the user to identify how he/she prefers to drink beer. At step 2212, the user may indicate that he/she prefers to drink beer in a mug. At step 2214, the interactive video may present the user with still another decision point asking the user to identify what food he/she enjoys eating while drinking beer. At step 2216, the user may select an option indicating that he/she enjoys eating nachos while drinking beer. As illustrated and described earlier, all the relevant data, e.g., user information, decision points, selected options, etc. are recorded in a log/table 2220 of database 2218.

As further illustrated in FIG. 22, the log/table 2220 of database 2218 contains additional data regarding the user's interactions made during another campaign, for example, a car rental campaign and a vacation campaign. Analysis of the data across campaigns may lead to additional conclusions, such as, e.g., 80% of users that went on vacation to a location by the sea chose a red car to travel in on their vacation by the sea, or that 92% of males that chose to drink beer with the girlfriends also like to eat at good restaurants.

It should be noted that the reports generated in accordance with various embodiments of the invention may be segmented and/or focused on any number of parameters or any basis/number of bases, such as user identity, a particular event, a particular selection/option/choice, etc. It should further be noted that the example campaigns and event recordings are not intended to be limiting and still additional information, such as those gathered in the aforementioned passive mode, such as the location of a vacation, weather experienced during the vacation, etc. can be crossed with user information to generate additional reporting information.

Moreover, and referring back to the smart algorithm discussed above, a user may reach a decision point via more than one selection paths. The smart algorithm may then determine how to analyze the user selection data. For example, the options presented to and selected by a user may be the focus of the smart algorithm. FIG. 23a illustrates an exemplary option tree, wherein a database log/table is configured to store or maintain the options selected by one or more users as, for example, described above. That is, as a user, e.g., interacts with an interactive video/presentation, and traverses decision points 2300-2316, it is the options selected at those decision points that are recorded/considered to be of import in a particular campaign or to-be-generated report. Hence, and as illustrated in FIG. 23a, at decision point 2300, User A may choose option A or B. As illustrated in the log/table 2318, User A selects option A at decision point 2300 and option B at decision point 2302 (at which User A had a choice to select between option A or B). Alternatively, instead of, e.g., recording and focusing on the resultant options selected by a user, the smart algorithm may choose to focus on the decision points taken/presented to a user instead the actual options selected by the user. FIG. 23b illustrates an exemplary decision tree, wherein a database log/table is configured to store or maintain the decision points traversed by one or more users. That is, as a user, e.g., interacts with an interactive video/presentation, and traverses decision points 2300-2316, it is the those decision points that are recorded/considered to be of import in a particular campaign or to-be-generated report. It should be noted that FIGS. 23a and 23b are representative of the same decision/option scenario, but with a differing perspective. Hence, and as illustrated in FIG. 23b, at decision point 1, User A may choose option A or B. As illustrated in the log/table 2318, the data recorded for User A is indicative of that user's traversal of decision point 1, and subsequently, decision points 2 and 7. User B on the other hand is recorded as traversing decisions points 1, 3, 4, and 7, as opposed to, e.g., the selected options chosen at those decision points as in the case illustrated in FIG. 23a. Hence, an extracted report may relay information regarding what decision points were traversed by a user instead of or in addition to the actual options selected by the user. Analyzing a user path along with, e.g., a selected sharing option may also provide better insight into not only what a user chose, but also what type of information users wish to share. Further still, reaction time and whether or not a user makes a selection during, e.g., an interactive video, may be useful information to gather for data mining purposes.

Further still, and in addition to the various scenarios described above, data mining in accordance with various embodiments may be utilized for many purposes. For example, an interactive movie trailer may be created before a final editing of the movie is completed. That is, based upon user interaction with the interactive trailer, the movie may be edited, e.g., scenes may be included/deleted from a final version of the movie based upon statistics collected from users indicating what users/audience actually wishes to see in the movie. Advertising entities may also utilize a similar procedure when creating new campaigns for products.

Additionally, user selected options may be utilized at the conclusion of, e.g., a video, by presenting the user with a customized/targeted landing page, coupons, prizes, or any other ending based upon the user path. In the context of sweepstakes, for example, prizes may be "created" for a user after a lottery presentation such that a user may be given the chance to win products he/she chose as options. Alternatively, the user may be allowed to retrieve gathered statistics in real-time such that the user may see/be informed about what other users may have chosen at a particular decision point. Moreover, such analytics may be utilized in a social networking context so that users may be aware of what friends chose/how they reacted to decision points.

It should be noted that data mining in accordance with various embodiments may be used not only for current trend analysis, but also for trend prediction.

Various embodiments are described herein with reference to drawings. These drawings illustrate certain details of specific embodiments that implement the systems and methods and programs of the present invention. However, describing the invention with drawings should not be construed as imposing on the invention any limitations that may be present in the drawings. Various embodiments contemplate methods, systems and program products on any machine-readable media for accomplishing its operations. The embodiments of the present invention may be implemented using an existing computer processor, or by a special purpose computer processor incorporated for this or another purpose or by a hardwired system.

As noted above, various embodiments include computer program products embodied or encoded on, e.g., a non-transitory computer/machine-readable media (e.g., memory) for carrying or having machine-executable instructions or data structures stored thereon. Such computer/machine-readable media can be any available media which can be accessed by a general purpose or special purpose computer, server, or other machine with a processor or controller. By way of example, such computer/machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures. When information is transferred or provided over a network or another communications connection (either hardwired, wireless, or a combination of hardwired or wireless) to a machine, the machine properly views the connection as, e.g., a transitory computer/machine-readable medium. Combinations of the above are also included within the scope of computer/machine-readable media. Machine-executable instructions comprise, for example, instructions and data which cause a general purpose computer, special purpose computer, or special purpose processing machines to perform a certain function or group of functions.

Various embodiments are also described in the general context of method processes which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing processes of the methods disclosed herein. The particular sequence of such executable instructions or associated data structures represent examples of corresponding acts for implementing the functions described in such processes and it is understood that the order of these processes may differ from what is depicted. Also, two or more processes may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching processes, correlation processes, comparison processes and decision processes. It should also be noted that the words "component" and "module" as used herein and/or in the claims is intended to encompass implementations using one or more lines of software code, and/or hardware implementations, and/or equipment for receiving manual inputs.

Various embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the present application may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The foregoing description of embodiments of the invention has been presented for purposes of illustration and description. It is not intended to be exhaustive or to limit the invention to the precise form disclosed. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangements of the preferred and other exemplary embodiments without departing from the spirit of the present invention.

What is claimed is:

1. A method, comprising:
   storing an interactive video as a plurality of predefined video paths, each path comprising a plurality of video segments, each video segment representing a predefined portion of one or more of the predefined video paths;
   receiving at least one characteristic of a first user of a plurality of different users;
   providing a first playthrough of the interactive video to the first user, wherein providing the first playthrough comprises:
      presenting, to the first user, a video segment in a predefined video path of the interactive video, the video segment having a predefined decision period during which the first user may select, in real-time as the video segment is playing, a subsequent video segment to be played automatically and immediately following a conclusion of the video segment;
      reaching the video segment and the decision period in the first playthrough;
      displaying, during the decision period in the first playthrough, a first set of options to the first user, each option in the first set of options being associated with a different subsequent video segment to be played following the video segment, wherein the first set of options presented to the first user is created based on the at least one characteristic of the first user; and
      receiving a selection of one of the options in the first set of options;
   recording, via a statistics engine, representations of traversed paths along a plurality of connected video segments of the interactive video by recording a plurality of events, the events comprising different decisions made in order to select video segments to be played following currently playing video segments and traverse different predefined video paths during separate presentations of the interactive video to the plurality of different users, wherein a particular recorded event comprises a passive interaction in that at least one video segment option to traverse within a particular set of video segment options is automatically selected on behalf of a particular user based on information related to the particular user, and wherein the particular recorded event is not visible to the particular user;
   receiving at least one characteristic of a second user of the plurality of different users;
   determining a relationship between the first user and the second user based on the at least one characteristic of the first user and the at least one characteristic of the second user;
   providing a second, separate playthrough of the interactive video to the second user, wherein providing the second, separate playthrough comprises:

receiving a plurality of decisions that results in the second user reaching the video segment and the decision period in the second playthrough, the video segment and decision period in the second playthrough being the same video segment and decision period in the first playthrough; and creating and displaying, during the decision period in the second playthrough, a second set of options to the second user different from the first set of options, each option in the second set of options being associated with a different subsequent segment for playback following the video segment, wherein the second set of options presented to the second user is created based on the plurality of events, the first set of options, and the relationship between the first user and the second user.

2. The method of claim 1, wherein a particular recorded event comprises an active interaction indicative of a user-initiated selection.

3. The method of claim 1, wherein a particular recorded event comprises an active interaction indicative of a one of a random or default selection.

4. The method of claim 1, wherein a particular recorded event comprises a passive interaction indicative of a non-user initiated selection associated with one of the users.

5. The method of claim 1, wherein a particular recorded event comprises a passive interaction indicative of a non-user initiated selection associated with a user other than a user viewing the interactive video.

6. The method of claim 1 further comprising, receiving a customer request for the report prior to the generating of the report.

7. The method of claim 6, wherein the generating of the report occurs in real-time relative to the receipt of the customer request.

8. The method of claim 1, further comprising:
transmitting a request from the statistics engine containing data concerning the recorded events; and
storing the data in a database,
wherein the request transmitted from the statistics engine comprises a hypertext transfer protocol request.

9. The method of claim 8, wherein the storing of the data in the database comprises storing a first plurality of interactions associated with a first one of the users in conjunction with a second plurality of interactions associated with a second one of the users.

10. The method of claim 1, wherein the report is indicative of recorded events corresponding to at least a single user and a single campaign.

11. The method of claim 1, wherein the report is indicative of recorded events corresponding to at least a single user across a plurality of campaigns.

12. The method of claim 8 further comprising, analyzing the data according to at least a predefined configuration associated with at least one campaign prior to the storing of the data.

13. The method of claim 8, wherein the data concerning the recorded events comprises at least one of details associated with a user interacting with the interactive video, details associated with the recorded events, and an identification of a campaign associated with the interactive video.

14. The method of claim 1 further comprising, presenting the report to a requesting customer subsequent to generating the report.

15. A system, comprising:
at least one memory storing an interactive video as a plurality of predefined video paths, each path comprising a plurality of video segments, each video segment representing a predefined portion of one or more of the predefined video paths; and at least one processing unit for executing computer-executable instructions stored in the memory, wherein execution of the instructions results in one or more application modules together comprising:

a plurality of player applications implemented on respective computing devices, wherein the player applications are configured to separately present the interactive video to a plurality of different users, wherein a first one of the player applications is configured to provide a first playthrough of the interactive video to a first user of the plurality of different users by:

receiving at least one characteristic of the first user;

presenting, to the first user, a video segment in a predefined video path of the interactive video, the video segment having a predefined decision period during which the first user may select, in real-time as the video segment is playing, a subsequent video segment to be played automatically and immediately following a conclusion of the video segment;

reaching the video segment and the decision period in the first playthrough;

displaying, during the decision period in the first playthrough, a first set of options to the first user, each option in the first set of options being associated with a different subsequent video segment to be played following the video segment, wherein the first set of options presented to the first user is created based on the at least one characteristic of the first user; and receiving a selection of one of the options in the first set of options; and a statistics engine, implemented within each player application, configured to record representations of traversed paths along a plurality of connected video segments of the interactive video by recording a plurality of events, the events comprising different decisions made in order to select video segments to be played following currently playing video segments and traverse different predefined video paths during the separate presentations of the interactive video to the plurality of different users, wherein a particular recorded event comprises a passive interaction in that at least one video segment option to traverse within a particular set of video segment options is automatically selected on behalf of a particular user based on information related to the particular user, and wherein the particular recorded event is not visible to the particular user, wherein a second player application is configured to provide a second, separate playthrough of the interactive video to a second user of the plurality of different users by:

receiving at least one characteristic of the second user;

determining a relationship between the first user and the second user based on the at least one characteristic of the first user and the at least one characteristic of the second user;

receiving a plurality of decisions that results in the second user reaching the video segment and the decision period in the second playthrough, the video segment and decision period in the second playthrough being the same video segment and decision period in the first playthrough; and creating and displaying, during the decision period in the second playthrough, a second set of options to the second user different from the first set of options, each option in the second set of options being associated with a different subsequent segment for playback following the video segment, wherein the second set of options presented to the second user is created based on the plurality of events, the first set of options, and the relationship between the first user and the second user.

16. The system of claim 15, wherein the statistics engine transmits a hypertext transfer protocol request comprising data concerning the recorded events.

17. The system of claim 15, wherein the report is indicative of recorded events corresponding to at least a single user and a single campaign.

18. The system of claim 15, wherein the report is indicative of recorded events corresponding to at least a single user across a plurality of campaigns.

19. The system of claim 15, wherein the application modules further comprise a server-hosted data manager configured to analyze data concerning the recorded events according to at least a predefined configuration associated with at least one campaign.

* * * * *